US010198842B2

(12) United States Patent
Korzunov

(10) Patent No.: US 10,198,842 B2
(45) Date of Patent: Feb. 5, 2019

(54) METHOD OF GENERATING A SYNTHETIC IMAGE

(71) Applicant: YANDEX EUROPE AG, Lucerne (CH)

(72) Inventor: Anton Vasilyevich Korzunov, Podolsk (RU)

(73) Assignee: YANDEX EUROPE AG, Lucerne (CH)

( * ) Notice: Subject to any disclaimer, the term of this patent is extended or adjusted under 35 U.S.C. 154(b) by 157 days.

(21) Appl. No.: 15/459,454

(22) Filed: Mar. 15, 2017

(65) Prior Publication Data
US 2017/0287187 A1 Oct. 5, 2017

(30) Foreign Application Priority Data

Apr. 4, 2016 (RU) .................................. 2016112610

(51) Int. Cl.
G06T 11/60 (2006.01)
G06T 7/73 (2017.01)
(Continued)

(52) U.S. Cl.
CPC ............ *G06T 11/60* (2013.01); *G06K 9/6202* (2013.01); *G06T 7/248* (2017.01); *G06T 7/73* (2017.01);
(Continued)

(58) Field of Classification Search
None
See application file for complete search history.

(56) References Cited

U.S. PATENT DOCUMENTS 4,464,789 A 8/1984 Sternberg
7,916,147 B2 3/2011 Clemie et al.
(Continued)

FOREIGN PATENT DOCUMENTS

EP 2464126 A1 6/2012
RU 2517685 C2 5/2014
(Continued)

OTHER PUBLICATIONS

Yang, Ya-Ting, Yi-Shin Tung, and Ja-Ling Wu. "Quality enhancement of frame rate up-converted video by adaptive frame skip and reliable motion extraction." IEEE Transactions on Circuits and Systems for Video Technology 17.12 (2007): 1700-1713. (Year: 2007).*

(Continued)

Primary Examiner — Bhavesh M Mehta
Assistant Examiner — Tracy Mangialaschi
(74) Attorney, Agent, or Firm — BCF LLP

(57) ABSTRACT

The methods and systems described herein comprise: receiving a first image and a second image, a first timestamp and a second timestamp, the first image and the second image depicting a common object; determining an actual position of first common object pixels and second common object pixels; computing a common object motion information based on the actual position of the first common object pixels and the second common object pixels, the first and the second timestamp; receiving a third image and a third timestamp, the third image depicting the common object; determining an actual position of third common object pixels; computing an estimated position of the third common object pixels based on the common object motion information, the third timestamp and the third pixels; if the actual position of the third common object pixels and the estimated (Continued)

position of the third common object pixels don't match, generating the synthetic image.

14 Claims, 7 Drawing Sheets

(51) Int. Cl.
*G06K 9/62* (2006.01)
*G06T 7/246* (2017.01)

(52) U.S. Cl.
CPC .......... *G06T 2207/10004* (2013.01); *G06T 2207/20221* (2013.01)

(56) References Cited

U.S. PATENT DOCUMENTS

| | | | |
|---|---|---|---|
| 8,406,534 | B2 | 3/2013 | Tong et al. |
| 9,445,003 | B1* | 9/2016 | Lelescu .............. H04N 5/23232 |
| 2009/0324131 | A1 | 12/2009 | Tong et al. |
| 2012/0043751 | A1 | 2/2012 | Hersch et al. |
| 2012/0057001 | A1* | 3/2012 | Morifuji ............ H04N 5/23238 348/50 |
| 2013/0088592 | A1* | 4/2013 | Falomkin ................. G06K 9/78 348/143 |
| 2014/0035906 | A1 | 2/2014 | Ranjan et al. |
| 2014/0307045 | A1 | 10/2014 | Richardt et al. |
| 2016/0063705 | A1* | 3/2016 | Xu ........................... G06T 5/50 382/199 |

FOREIGN PATENT DOCUMENTS

| | | | |
|---|---|---|---|
| WO | 2007116248 | A1 | 10/2007 |
| WO | 2015171815 | A1 | 11/2015 |
| WO | WO-2015171815 | A1 * | 11/2015 .............. G06T 3/40 |

OTHER PUBLICATIONS

Kyutoku et al., On-road Obstacle Detection by Comparing Present and Past In-vehicle Camera Images, MVA2011 IAPR Conference on Machine Vision Applications, Jun. 13-15, 2011, Nara, Japan, 357-360.

Uchiyama et al., Removal of Moving Objects from a Street-view Image by Fusing Multiple Image Sequences, 2010 International Conference on Pattern Recognition, 3456-3459.

Bohm, Multi-image Fusion fro Occlusion-Free Façade Texturing, Institut für Photogrammetrie, Universität Stuttgart, Germany, Commission V, WG V/2, 6 pages, 2004.

Flores et al., Removing pedestrians from Google Street View images, Department of Computer Science and Engineering, University of California, San Diego, 978-1-4244-7028-0/10, 2010 IEEE, 6 pages.

Haro, User-guided Pedestrian and Object Removal, 978-1-4673-5674-9/12, 50-55, 2012.

Kyutoku et al., Subtraction-Based Forward Obstacle Detection Using Illumination Insensitive Feature for Driving-Support, A. Fusiello et al. (Eds.): ECCV 2012 Ws/Demos, Part II LNCS 7584, pp. 515-525, 2012, Springer-Verlag Berlin Heidelberg 2012.

* cited by examiner

METHOD OF GENERATING A SYNTHETIC IMAGE

CROSS-REFERENCE

The present application claims priority to Russian Patent Application No. 2016112610, filed Apr. 4, 2016, entitled "METHOD OF GENERATING A SYNTHETIC IMAGE", the entirety of which is incorporated herein by reference.

FIELD

The present technology relates to methods of and systems for processing images and generating synthetic images.

BACKGROUND

With the invention of personal computing, advancements in computer software and digital photography, it is now much easier to capture panoramic images. In fact, using a proper photography technique and panoramic equipment, it is now possible to create near-perfect panoramas at extremely high resolutions. Some photographers are able to create gargantuan "giga-pixel" panoramas. Today, digital panoramic photography is quite popular and common not only among landscape photographers, but also among architectural and cityscape photographers. In other instances, panoramic photographs may be used by map services in order to produce map views such as "street view" in GOOGLE™ maps, for example.

Generally speaking, capturing panoramic photographs may be done via a plethora of methods and devices. For example, in order to capture panoramic photographs, a curved lens camera may be used to perform a short rotation or a full rotation of its lens to capture the photograph. In other examples, a fixed lens camera may produce panoramic photographs by using different techniques such as segmentation. Furthermore, catadioptric and 3D cameras may be used as well in order to capture panoramas.

However, a multitude of issues or errors may be encountered while generating panoramic photographs such as vertical banding, vignetting, ghosting, stitching errors, color shifts, curved horizons and others. For example, the main cause of ghosting problem is movement between frames. In other words, ghosting may occur when an object in the overlap zone (the area where two frames overlap) has moved position between shooting one frame and the next. The moving object may be a car, a cloud, a person and the like.

Therefore, some photographs may have been generated with errors or noise due to an object having moved from its initial position in one frame to another position in the second frame. Currently, such errors due to misinterpretation of the objects position in sequential images are dealt by discarding the errored images from the set of captured images.

SUMMARY

It is an object of the present technology to ameliorate at least some of the inconveniences present in the prior art.

Embodiments of the present technology have been developed based on developers' appreciation of at least one technical problem associated with the prior art approaches. Without wishing to be bound to any specific theory, developers of the present technology believe that discarding certain "defective" images may deprive the final result of the panoramic image of valuable/important data points.

Furthermore, developers of the present technology have appreciated that replacing and/or adding synthetic images into the set of captured images may allow to retrieve the valuable/important data points which otherwise would not be accessible.

According to one aspect of the present technology, there is provided a method of generating a synthetic image, the method being executable at a server. The method may comprise receiving, by the server, first data associated with a first image and second data associated with a second image. The first data comprises first pixels and a first timestamp and the second data comprises second pixels and a second timestamp. The first image and the second image depict common object. The method may comprise determining, by the server, an actual position of first common object pixels within the first pixels and an actual position of second common object pixels within the second pixels. The first common object pixels and the second common object pixels are associated with the common object in the first image and the second image, respectively. The method may comprise computing, by the server, a common object motion information based on the actual position of the first common object pixels, the actual position of the second common object pixels, the first timestamp and the second timestamp. The common object motion information is representative of a movement pattern of the common object between a position of the common object in the first image and a position of the common object in the second image. The method may comprise receiving, by the server, third data associated with a third image, wherein the third data comprises third pixels and a third timestamp and wherein the third image depicts the common object. The method may comprise determining, by the server, an actual position of third common object pixels within the third pixels, wherein the third common object pixels are associated with the common object in the third image. The method may comprise computing, by the server, an estimated position of the third common object pixels within the third pixels based on the common object motion information, the third timestamp and the third pixels. The method may comprise determining, by the server, if the actual position of the third common object pixels and the estimated position of the third common object pixels match. The method may comprise, in response to the actual position of the third common object pixels and the estimated position of the third common object pixels not matching, generating, by the server, the synthetic image based on the third image and at least one of the first image and the second image and which comprises at least the third common object pixels and correction pixels. The generating the synthetic image may comprise assigning, by the server, the third common object pixels to the estimated position of the third common object pixels within the synthetic image. The generating the synthetic image may comprise determining, by the server, correction pixel positions of the correction pixels and the correction pixels based on the actual position of the third common object pixels and at least one of the first image and the second image. The generating the synthetic image may comprise assigning, by the server, the correction pixels to the correction pixel positions of the correction pixels within the synthetic image.

In some implementations of the method, at least some of the correction pixel positions of the correction pixels are at least some pixel positions within the actual position of the third common object pixels within the third image.

In some implementations of the method, wherein the first image, the second picture image and the third image are captured by a camera in motion, and wherein the first data, the second data and the third data is received by the server from the camera, the method may further comprise receiving, by the server, camera motion information associated with the camera in motion. The common object motion information may be further based on the camera motion information.

In some implementations of the method, at least one of the first image, the second image, the third image and the synthetic image is a panoramic image.

In some implementations of the method, the method may further comprise, in response to the actual position of the third object pixels and the estimated position of the third object pixels not matching, determining, by the server, that an instant velocity of the common object at a time corresponding to the third timestamp is distinct from an instant velocity of the common object at a time corresponding to the second timestamp. The method may further comprise storing, by the server, the instant velocity of the common object at the time corresponding to the third timestamp and the instant velocity of the common object at the time corresponding to the second timestamp.

In some implementations of the method, wherein the first image and the second image further depict, in addition to the common object, a different object, the method may comprise determining, by the server, the actual position of first common object pixels within the first pixels and the actual position of second common object pixels within the second pixels, wherein the first common object pixels and the second common object pixels are associated with the common object in the first image and the second image, respectively. The method may comprise determining, by the server, an actual position of first different object pixels within the first pixels and an actual position of second different object pixels within the second pixels, wherein the first different object pixels and the second different object pixels are associated with the different object in the first image and the second image, respectively. The method may comprise computing, by the server, the common object motion information based on the actual position of the first common object pixels, the actual position of the second common object pixels, the first timestamp and the second timestamp. The method may comprise computing, by the server, a different object motion information based on the actual position of the first different object pixels, the actual position of the second different object pixels, the first timestamp and the second timestamp. The method may comprise determining, by the server, a motion state of the common object based on the common object motion information. The method may comprise determining, by the server, a motion state of the different object based on the different object motion information.

In some implementations of the method, wherein in response to the motion state of the common object being dynamic, the method may further comprise computing, by the server, the estimated position of the third common object pixels within the third pixels based on the common object motion information, the third timestamp and the third pixels. The method may further comprise determining, by the server, if the actual position of the third common object pixels and the estimated position of the third common object pixels matches. The method may further comprise, in response to the actual position of the third common object pixels and the estimated position of the third common object pixels not matching, generating, by the server, the synthetic image based on the third image and at least one of the first image and the second image and which may comprise at least the third common object pixels and the correction pixels. The generating may comprise assigning, by the server, the third common object pixels to the estimated position of the third common object pixels within the synthetic image. The generating may comprise determining, by the server, correction pixel positions of the correction pixels and the correction pixels based on the actual position of the third common object pixels and at least one of the first image and the second image. The generating may comprise assigning, by the server, the correction pixels to the correction pixel positions of the correction pixels within the synthetic image. In response to the motion state of the different object being dynamic, the method may further comprise computing, by the server, the estimated position of the third different object pixels within the third pixels based on the different object motion information, the third timestamp and the third pixels. The method may further comprise determining, by the server, if the actual position of the third different object pixels and the estimated position of the third different object pixels matches. The method may further comprise, in response to the actual position of the third different object pixels and the estimated position of the third different object pixels not matching, generating, by the server, the synthetic image based on the third image and at least one of the first image and the second image and which may comprise at least the third different object pixels and different correction pixels. The generating may comprise assigning, by the server, the third different object pixels to the estimated position of the third different object pixels within the synthetic image. The generating may comprise determining, by the server, different correction pixel positions of the different correction pixels and the different correction pixels based on the actual position of the third different object pixels and at least one of the first image and the second image. The generating may comprise assigning, by the server, the different correction pixels to the different correction pixel positions of the different correction pixels within the synthetic image.

In some implementations of the method, the method may further comprise determining, by the server, a new image capturing frequency based on the common object motion information. The method may further comprise sending, by the server, an indication of the new image capturing frequency to the camera. The method may further comprise capturing, by the camera, new images according to the new image capturing frequency.

In some implementations of the method, the determining the new image capturing frequency may comprise increasing image capturing frequency in response to the instant velocity of the common object at the time corresponding to the second timestamp being superior to an instant velocity threshold. Also, the determining the new image capturing frequency may comprise decreasing the image capturing frequency in response to the instant velocity of the common object at the time corresponding to the second timestamp being inferior to the instant velocity threshold.

In some implementations of the method, the generating the synthetic image may comprise executing, by the server, a synthetic image generation procedure. The synthetic image generation procedure may comprise generating, by the server, a first, a second and a third rendered state of the synthetic image.

In some implementations of the method, the executing the synthetic image generation procedure may comprise executing, by the server, a correction verification routine.

In some implementations of the method, the determining the actual position of first common object pixels, the actual position of second common object pixels and the actual position of third common object pixels may comprise performing, by the server, an object recognition technique.

According to another aspect of the present technology, there is provided a system for generating a synthetic image, wherein the system comprises a camera, a client device and a server. The system is configured to receive, by the server from the camera, first data associated with a first image and second data associated with a second image, wherein the first data comprises first pixels and a first timestamp, and wherein the second data comprises second pixels and a second timestamp. The first image and the second image depict a common object. The system is configured to determine, by the server, an actual position of first common object pixels within the first pixels and an actual position of second common object pixels within the second pixels, wherein the first common object pixels and the second common object pixels are associated with the common object in the first image and the second image, respectively. The system is configured to compute, by the server, a common object motion information based on the actual position of the first common object pixels, the actual position of the second common object pixels, the first timestamp and the second timestamp, wherein the common object motion information is representative of a movement pattern of the common object between a position of the common object in the first image and a position of the common object in the second image. The system is configured to receive, by the server from the camera, third data associated with a third image, wherein the third data comprises third pixels and a third timestamp, and wherein the third image depicts the common object. The system is configured to determine, by the server, an actual position of third common object pixels within the third pixels, wherein the third common object pixels is associated with the common object in the third image. The system is configured to compute, by the server, an estimated position of the third common object pixels within the third pixels based on the common object motion information, the third timestamp and the third pixels. The system is configured to determine, by the server, if the actual position of the third common object pixels and the estimated position of the third common object pixels match. The system is configured to, in response to the actual position of the third common object pixels and the estimated position of the third common object pixels not matching, generate, by the server, the synthetic image based on the third image and at least one of the first image and the second image and which comprises at least the third common object pixels and correction pixels. To generate the synthetic image the system is configured to assign, by the server, the third common object pixels to the estimated position of the third common object pixels within the synthetic image. To generate the synthetic image the system is configured to determine, by the server, correction pixel positions of the correction pixels and the correction pixels based on the actual position of the third common object pixels and at least one of the first image and the second image. To generate the synthetic image the system is configured to assign, by the server, the correction pixels to the correction pixel positions of the correction pixels within the synthetic image. The system is configured to send, by the server to the client device, at least one of the first image, the second image and the synthetic image for displaying the at least one of the first image, the second image and the synthetic image to a user of the client device.

According to an additional aspect of the present technology, there is provided a server for generating a synthetic image, wherein the server comprises a processor for executing computer readable instructions. The processor is configured to receive first data associated with a first image and second data associated with a second image, wherein the first data comprises first pixels and a first timestamp, and wherein the second data comprises second pixels and a second timestamp. The first image and the second image depict a common object. The processor is configured to determine an actual position of first common object pixels within the first pixels and an actual position of second common object pixels within the second pixels, wherein the first common object pixels and the second common object pixels are associated with the common object in the first image and the second image, respectively. The processor is configured to compute a common object motion information based on the actual position of the first common object pixels, the actual position of the second common object pixels, the first timestamp and the second timestamp, wherein the common object motion information is representative of a movement pattern of the common object between a position of the common object in the first image and a position of the common object in the second image. The processor is configured to receive third data associated with a third image, wherein the third data comprises third pixels and a third timestamp, and wherein the third image depicts the common object. The processor is configured to determine an actual position of third common object pixels within the third pixels, wherein the third common object pixels are associated with the common object in the third image. The processor is configured to compute an estimated position of the third common object pixels within the third pixels based on the common object motion information, the third timestamp and the third pixels. The processor is configured to determine if the actual position of the third common object pixels and the estimated position of the third common object pixels match. The processor is configured to, in response to the actual position of the third common object pixels and the estimated position of the third common object pixels not matching, generate the synthetic image based on the third image and at least one of the first image and the second image and which comprises at least the third common object pixels and correction pixels. To generate the synthetic image the processor is configured to assign the third common object pixels to the estimated position of the third common object pixels within the synthetic image. To generate the synthetic image the processor is configured to determine correction pixel positions of the correction pixels and the correction pixels based on the actual position of the third common object pixels and at least one of the first image and the second image. To generate the synthetic image the processor is configured to assign the correction pixels to the correction pixel positions of the correction pixels within the synthetic image.

In the context of the present specification, unless expressly provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless expressly provided otherwise, "client device" is any computer hardware that is capable of running software appropriate to the relevant task at hand. Thus, some (non-limiting) examples of client devices include personal computers (desktops, laptops, netbooks, etc.), smartphones, and tablets. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless expressly provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the expression "component" is meant to include software (appropriate to a particular hardware context) that is both necessary and sufficient to achieve the specific function(s) being referenced.

In the context of the present specification, unless expressly provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, the expression "interactive" is meant to indicate that something is responsive to a user's input or that at least portions thereof are responsive to a user's input.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DESCRIPTION

Figure 1:
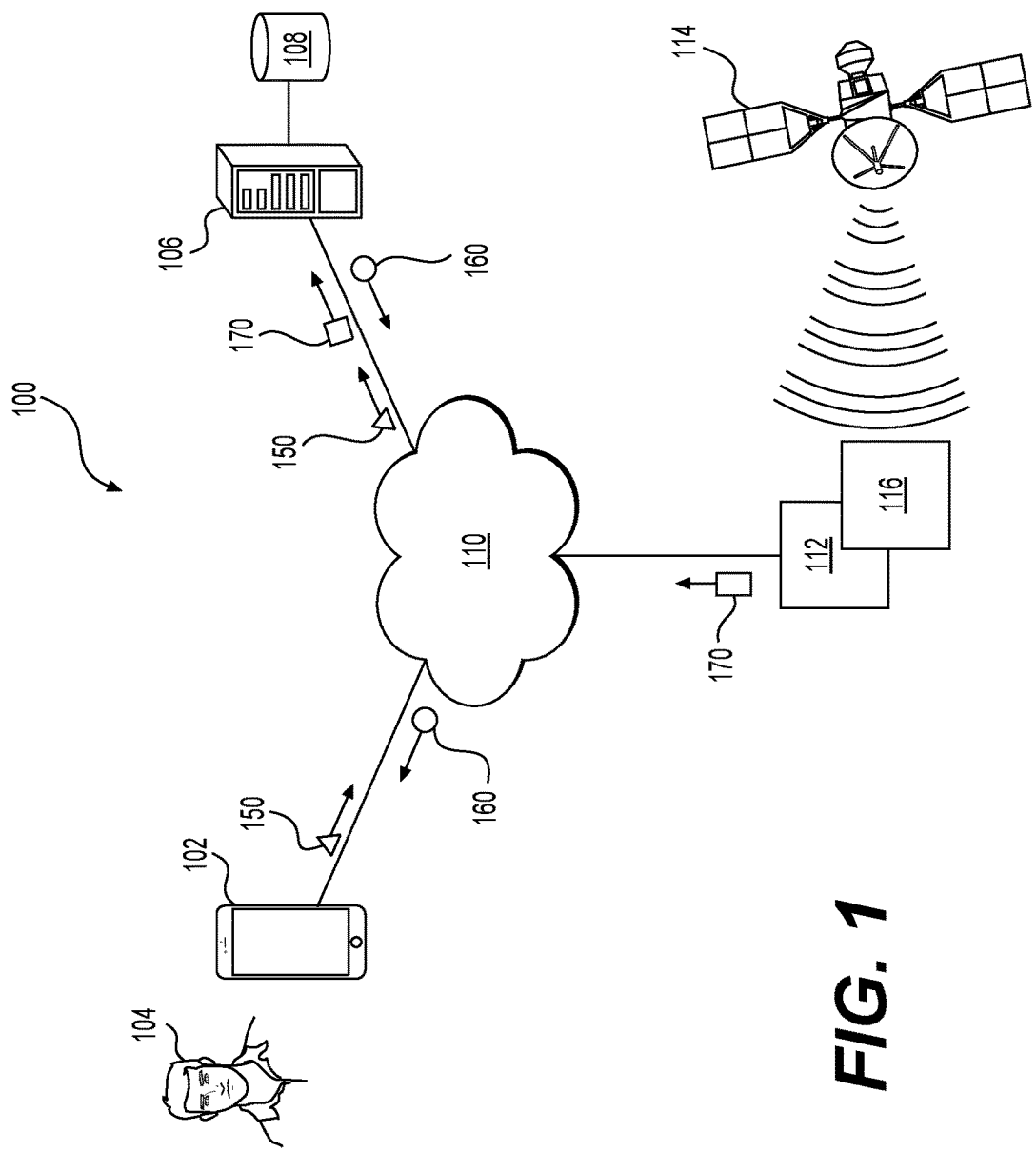
FIG. 1 depicts a schematic diagram of a system for enabling the execution of at least some functionalities as envisioned in some implementations of the present technology.

In FIG. 1 there is depicted a schematic diagram of a system 100 which is communicatively coupled via a network 110 such as envisioned in some embodiments of the present technology. It is to be expressly understood that the system 100 is depicted as an illustrative implementation of the present technology. Thus, the following description should be considered only as the description of the illustrative implementation of the present technology. This description is not intended to define the scope or set forth the bounds of the present technology. In some cases, what are believed to be helpful examples of modifications to the system 100 may also be described below. This is done merely as an aid to understanding, and, again, not to define the scope or set forth the bounds of the present technology. These modifications are not an exhaustive list, and, as a person skilled in the art would understand, other modification are likely possible. Further, where no examples of modifications have been set forth, it should not be interpreted that no modifications are possible and/or that what is described is the sole manner of implementing that, element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

In some embodiments of the present technology, the system 100 may comprise a client device 102 associated with a user 104, a server 106, a database 108, a camera 112 and a GPS satellite 114, all of which will be further described below with respect to some examples of implementations of the present technology. As seen in FIG. 1, the client device 102, the server 106 and the camera 112 are communicatively coupled via the network 110.

How a communication coupling via the network 110 is implemented is not particularly limited and will depend on which devices are connected to the network 110. As a non-limiting example, the connection of a server 106 to the network 110 can be implemented via a wired connection (such as an Ethernet based connection). At the same time, other devices could be also connected in other ways. In those examples, where the client device 102 is implemented as a wireless communication device (e.g. a smart-phone), the connection can be implemented as a wireless communication network (such as but not limited to, a 3G communications network link, a 4G communications network link, a Wireless Fidelity, or WiFi® for short, Bluetooth® and the like). In those examples, where the client device 102 is implemented as a desktop computer, the communication link can be either wireless or wired (such as an Ethernet based connection).

As previously mentioned, the system 100 may comprise the server 106. The server 106 may be implemented as a conventional computer server. In an example of an embodiment of the present technology, the server 106 may be implemented as a Dell™ PowerEdge™ Server running the Microsoft™ Windows Server™ operating system. Needless to say, the server 106 may be implemented in any other suitable hardware and/or software and/or firmware or a combination thereof. In the depicted non-limiting embodiment of present technology, the server 106 is a single server. In alternative non-limiting embodiments of the present technology, the functionality of the server 106 may be distributed and may be implemented via multiple servers. In some embodiments, the server 106 may be configured to store computer-readable instructions that, when executed, may facilitate accomplishing and/or performing some or all functionalities of the present technology.

The implementations of the server 106 are well known in the art. So, suffice it to state, that the server 106 may comprise inter alia a network communication interface (such as a modem, a network card and the like) (not depicted) for two-way communication over the network 110; and a processor (not depicted) coupled to the network communication interface, the processor being configured to execute various routines, including those described herein below. To that end the processor may store and/or have access to the computer-readable instructions mentioned above.

As shown in FIG. 1, the database 108 is communicatively coupled to the server 106 but, in alternative implementations, the database 108 may be communicatively coupled to the server 106 via the network 110 without departing from the teachings of the present technology. Although the database 108 is illustrated schematically herein as a single entity, it is contemplated that the database 108 may be configured in a distributed manner, for example, the database 108 could have different components, each component being configured for a particular kind of retrieval therefrom or storage therein. The database 108 may be a structured collection of data, irrespective of its particular structure or the computer hardware on which data is stored, implemented or otherwise rendered available for use. The database 108 may reside on the same hardware as a process that stores or makes use of the information stored in the database 108 or it may reside on separate hardware, such as on the server 106. Generally speaking, the database 108 may receive data from the server 106 for storage thereof and may provide stored data to the server 106 for use thereof.

Also depicted in FIG. 1, the client device 102 is associated with the user 104. However, the client device 102 being associated with the user 104 does not imply a need to login by the user 104. Hardware implementation of the client device 102 is not particularly limited. The client device 102 may be, for example and without being limitative, a desktop computer, a laptop computer, a smart phone (e.g. an Apple iPhone™ or a Samsung Galaxy SS™), a personal digital assistant (PDA) or any other device including computing functionality and data communication capabilities. The client device 102 may comprise inter alia internal hardware components including one or more single or multi-core processors collectively referred to herein as processor (not depicted), a random access memory (not depicted), and a network interface (not depicted) for communicative coupling to the network 110.

In some embodiments, the client device 102 may be configured to execute a browser application (not depicted). Generally speaking, the purpose of the browser application is to enable the user 104 associated with the client device 102 to access one or more web resources. How the browser application is implemented is not particularly limited. One example of the browser application may be embodied as a Yandex™ browser. In other embodiments, the one or more resources that are accessed by the user 104 may be hosted by the server 106. For example, responsive to the user 104 being desirous to access the one or more resources hosted by the server 106 via the browser application, the client device 102 may be configured to send a request 150 to the server 106 via the network 110. Responsive to receiving the request 150, the server 106 may be configured to generate and send a client data packet 160 to the client device 102 via the network 110. The client data packet 160 and content thereof will be further described below.

Also depicted in FIG. 1 is the camera 112 which may include an optical sensor (e.g., a charged coupled device (CCD), or a complementary metal-oxide semiconductor (CMOS) image sensor), to facilitate camera functions, such as recording images, videos and the like. Generally speaking, the camera 112 may be any optical instrument for recording images, which may be stored locally, transmitted to another location, or both. The images recorded and/or captured by the camera 112 may be individual still photographs or sequences of images which may be referred to as videos. As a person skilled in the art will understand, the camera 112 may record and/or capture light of the visible spectrum and/or other portions of the electromagnetic spectrum. Needless to say, the camera 112 may be any optical device which creates a single image of an object, a scene or a combination thereof, and records it on an electronic sensor or photographic film.

In some embodiments of the present technology, the camera 112 may be configured to capture and record panoramic images. Technically speaking, panoramic images are particular captured images which have horizontally elongated fields of view. Some panoramic images captured by the camera 112 may have aspect ratios of 4:1, 10:1 or other aspect ratios of panoramic images. In some instances, the camera 112 may capture and record panoramic images, without departing from the scope of the present technology, which cover fields of view of up to 360 degrees.

In other embodiments, the camera 112 may be configured to record a respective timestamp associated with each image being captured and recorded. In additional embodiments, the camera 112 may comprise an integrated GPS module 116 for receiving GPS signals that are transmitted thereto by the GPS satellite 114. Hence, the camera 112 may further record a geo-position of the camera 112 for each image being captured and recorded. In alternative embodiments, the GPS module 116 may be a GLONASS module, the GLONASS module sending respective GLONASS signals.

Figure 5:
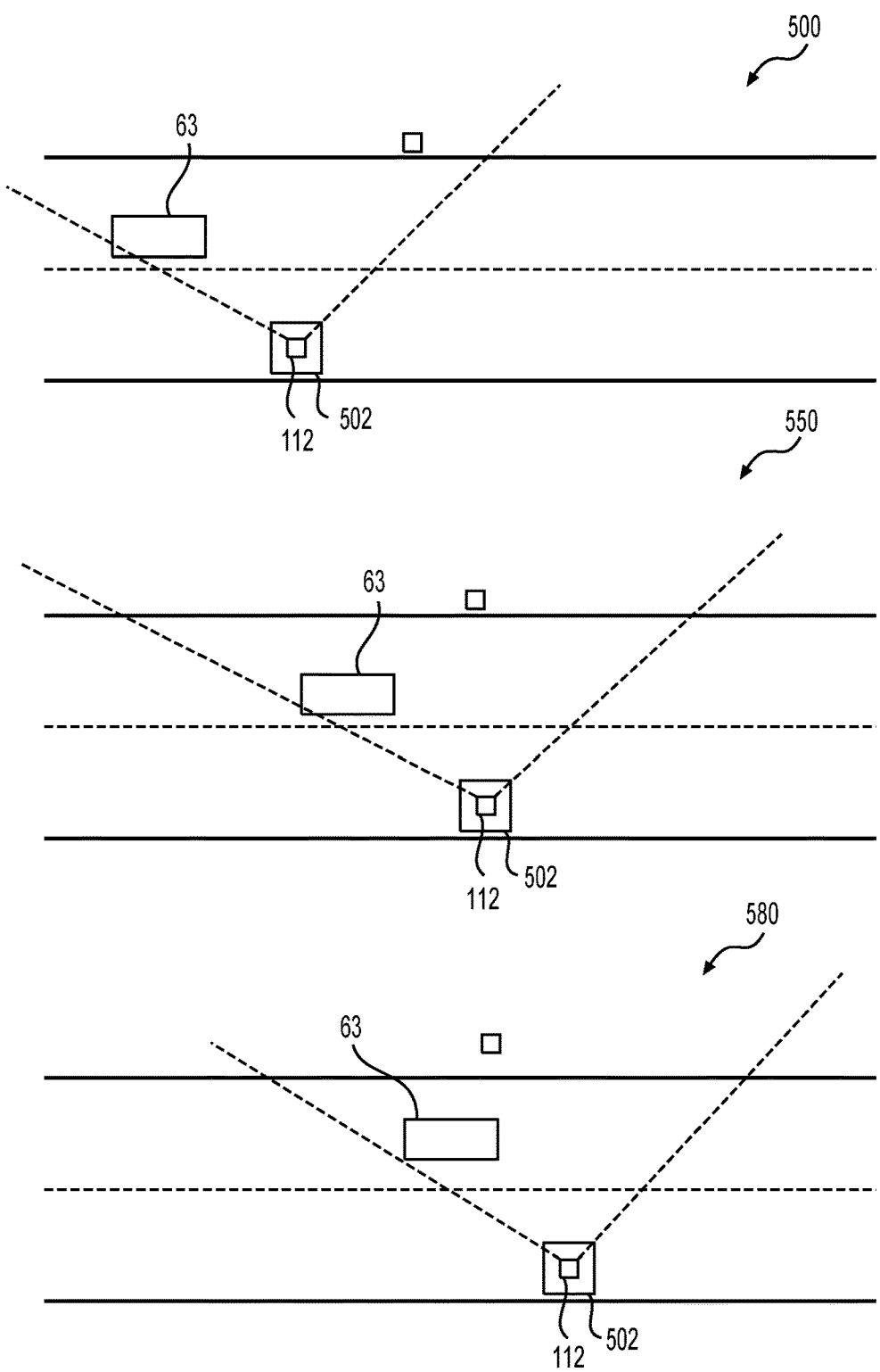
FIG. 5 depicts an alternative embodiment wherein a camera of FIG. 1 is in motion.

In yet other embodiments of the present technology, the camera 112 may be mounted on a moving vehicle 502 depicted in FIG. 5. In this case, the camera 112 may be in motion since the moving vehicle 502 may be in motion. Some implementations of the present technology wherein the camera 112 is in motion will be further described below with reference to FIG. 5.

In alternative embodiments, the camera 112 may be configured to capture and record images according to an image capturing frequency. In other words, the image capturing frequency may trigger the camera 112 to capture and record the images at particular time intervals. In some implementations of the present technology that will be further described below, the server 106 may be configured to send an indication of a new image capturing frequency (not depicted) to the camera 112.

In additional embodiments, the camera 112 may be configured to generate and send a camera data packet 170 (in FIG. 1) to the server 106 via the network 110. In other words, the server 106 may receive via the network 110 the camera data packet 170 from the camera 112. In some embodiments, the camera data packet 170 may comprise a plurality of data clusters 200 depicted in FIG. 2. Each data cluster within the plurality of data clusters 200 may be associated with a respective image recorded by the camera 112.

In other embodiments, the camera data packet 170 may be a plurality of separate camera data packets received separately in time by the server 106. In such a case, each separate camera data packet within the plurality of separate camera data packets may comprise a respective data cluster within the plurality of data clusters 200.

Figure 2:
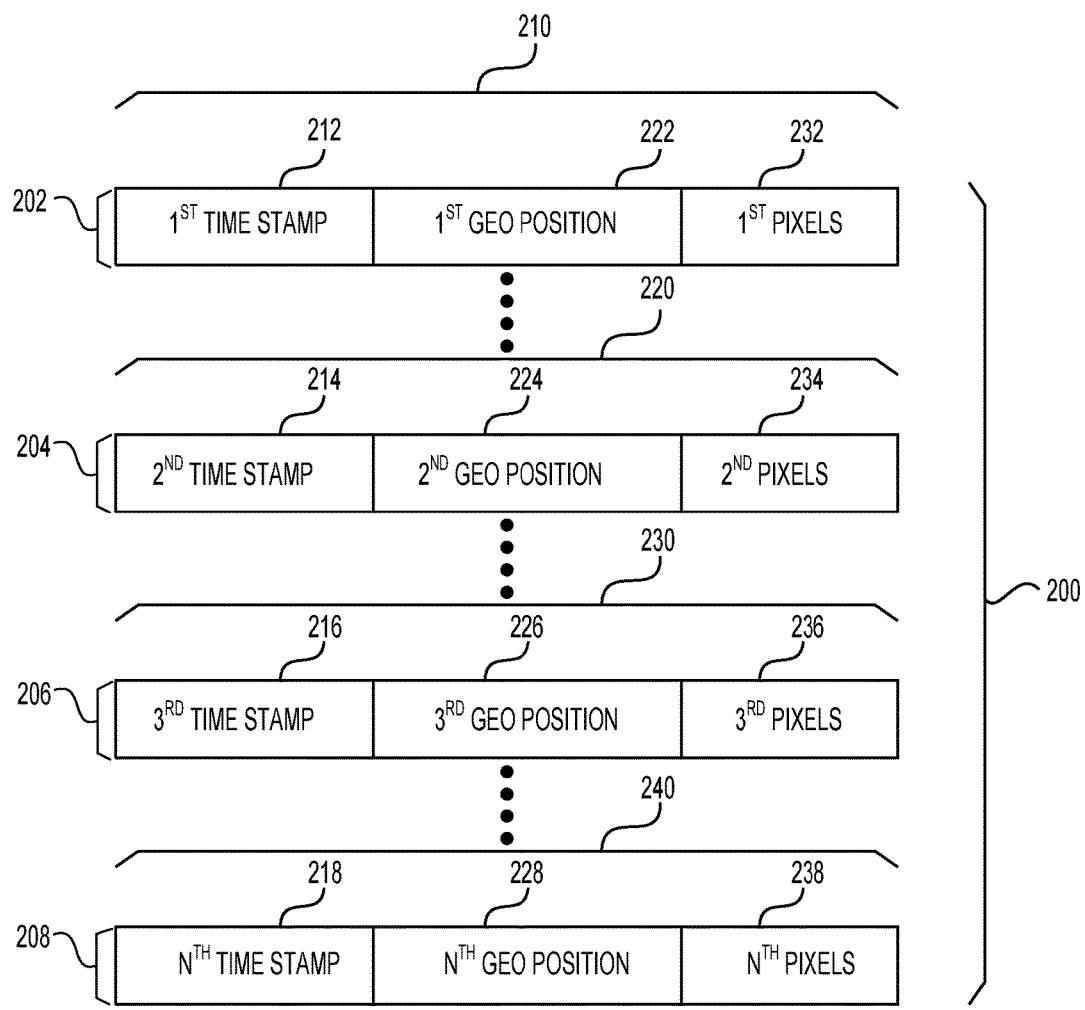
FIG. 2 depicts a plurality of data clusters which may be comprised within a camera data packet that is sent from a camera of FIG. 1 to a server of FIG. 1 in some implementations of the present technology.
Figure 3:
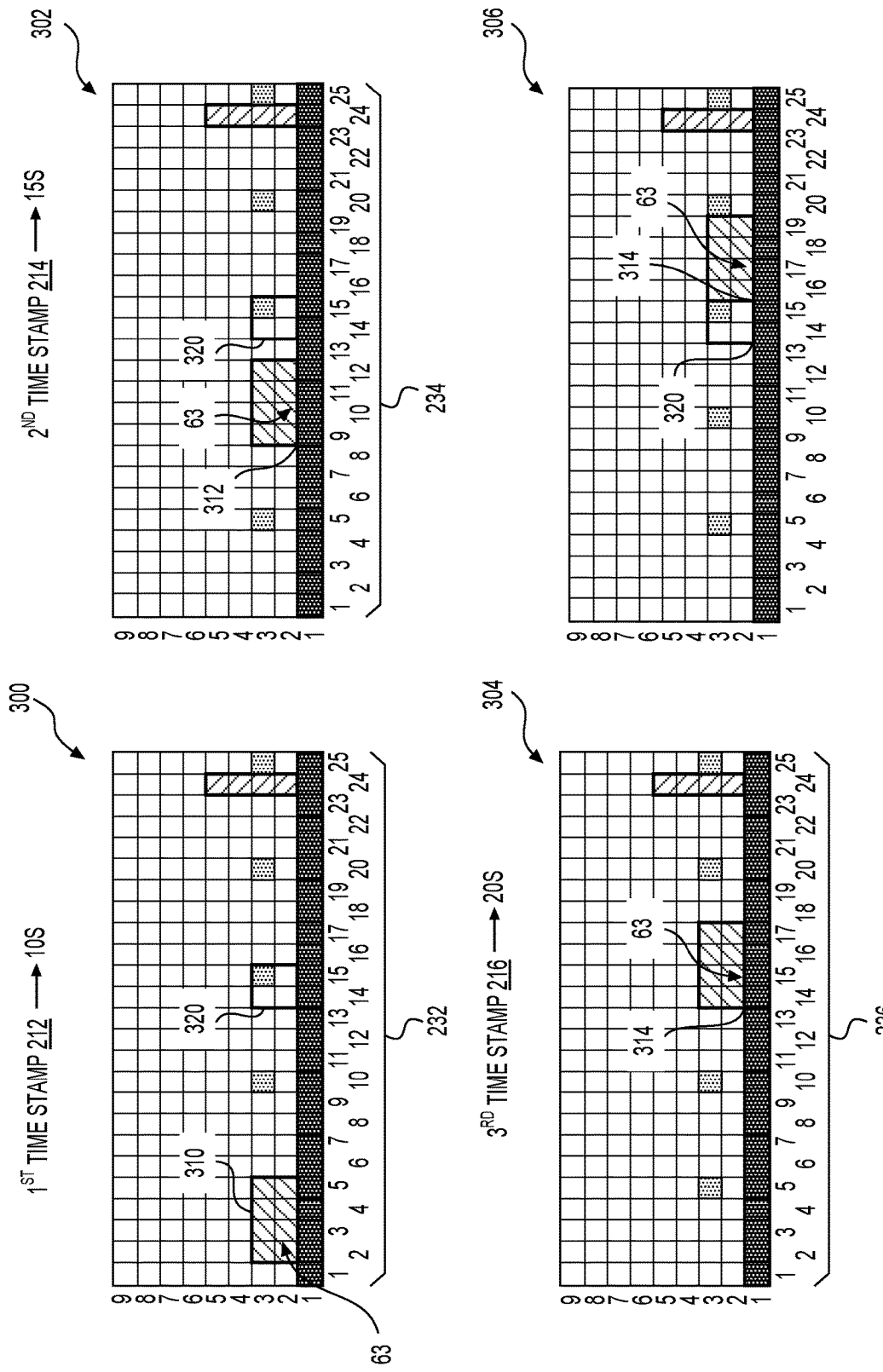
FIG. 3 depicts a first image, a second image and a third image captured and recorded by a camera of FIG. 1 in a first scenario and a synthetic image generated by a server of FIG. 1 in some implementations of the present technology.

For example, with reference to FIGS. 2 and 3, a first data cluster 202 may comprise first data 210 associated with a first image 300. The first data 210 may comprise a first timestamp 212 and first pixels 232. In additional embodiments, the first data 210 may further comprise a first geo-position 222, wherein the first geo-position 222 corresponds to a geo-position of the camera 112 when the camera 112 was capturing the first image 300. A second data cluster 204 may comprise second data 220 associated with a second image 302. The second data 220 may comprise a second timestamp 214 and second pixels 234. In additional embodiments, the second data 220 may further comprise a second geo-position 224, wherein the second geo-position 224 corresponds to a geo-position of the camera 112 when the camera 112 was capturing the second image 302. A third data cluster 206 may comprise third data 230 associated with a third image 304. The third data 230 may comprise a third timestamp 216 and third pixels 236. In additional embodiments, the third data 230 may further comprise a third geo-position 226, wherein the third geo-position 226 corresponds to a geo-position of the camera 112 when the camera 112 was capturing the second image 302.

In some embodiments, at least one of the first image 300, the second image 302 and the third image 304 may be a panoramic image.

As depicted in FIG. 2 the plurality of data clusters 200 may comprise more than the first data cluster 202, the second data cluster 204 and the third data cluster 206. For example, the plurality of data clusters 200 may comprise a Nth data cluster 208. The Nth data cluster 208 may comprise Nth data 240 associated with a Nth image (not depicted). The Nth data 240 may comprise a Nth timestamp 218 and Nth pixels 238. In additional embodiments, the Nth data 240 may further comprise a Nth geo-position 228, wherein the Nth geo-position 228 corresponds to a geo-position of the camera 112 when the camera 112 was capturing the Nth image. This means that in some implementations, the camera 112 may capture more than the first image 300, the second image 302 and the third image 304, without departing from the scope of the present technology, such as in a case when the camera 112 records a large set of images or a video (e.g., a set of N images).

In some embodiments, the camera 112 may record the first image 300, the second image 302 and the third image 304 in a sequential manner. In other words, the third image 304 may be captured after the second image 302 and wherein the second image 302 may be captured after the first image 300. In other embodiments, the camera 112 may record the first image 300, the second image 302 and the third image 304 in a consecutive manner. In other words, the third image 304 may be captured directly after the second image 302 and wherein the second image 302 may be captured directly after the first image 300. In embodiments wherein the camera 112 recorded the first image 300, the second image 302 and the third image 304 in a consecutive manner, a difference between the second timestamp 214 and the first timestamp 212 and/or a difference between the third timestamp 216 and the second timestamp 214 may represent the image capturing frequency of the camera 112.

Responsive to the server 106 receiving the camera data packet 170, the server 106 may be configured to analyze the plurality of data clusters 200. An example of the analyzing of the plurality of data clusters 200 will now be provided with respect to the first data cluster 202, the second data cluster 204 and the third data cluster 206. However, the analyzing of the plurality of data clusters 200 by the server 106 may be executed for any additional number of clusters within the plurality of data clusters 200 without departing from the scope of the present technology.

First Scenario

With continued reference to FIG. 3, in some embodiments, the analyzing of the plurality of data clusters 200 by the server 106 may comprise the server 106 being configured to determine an actual position of first common object pixels 310 within the first pixels 232, an actual position of second common object pixels 312 within the second pixels 234 and an actual position of third common object pixels 314 within the third pixels 236. In this case, the first common object pixels 310, the second common object pixels 312 and the third common object pixels 314 may be associated with a common object 63 in the first image 300, the second image 302 and the third image 304 respectively, such as depicted in FIG. 3. To that end, the server 106 may be configured to detect the common object 63 in the first image 300, the second image 302 and the third image 304.

In a first scenario, the detection of the common object 63 may be performed by the server 106 via a plurality of object recognition techniques. The plurality of object recognition techniques may include edge detection, recognition by parts for example. In other implementations appearance-based methods may be used amongst the plurality of object recognition techniques such as edge matching, divide-and-conquer search, greyscale matching, gradient matching, histograms of receptive field responses, and the like. Further, feature-based methods may be used amongst the plurality of object recognition techniques such as interpretation trees, pose consistency, pose clustering, invariance, geometric hashing, scale-invariant feature transform (SIFT), speeded up robust features (SURF), and the like. In additional implementations, other computer vision methods may be performed by the server 106 for detecting the common object 63 in the first image 300, the second image 302 and the third image 304 without deviating from the novel art of this disclosure.

In the non-limiting example of FIG. 3, the server 106 may detect the actual position of the first common object pixels 310 within the first pixels 232 as being (2,2) (2,3) (2,4) (2,5) (3,2) (3,3) (3,4) and (3,5). The server 106 may detect the actual position of the second common object pixels 312 within the second pixels 234 as being (2,9) (2,10) (2,11) (2,12) (3,9) (3,10) (3,11) and (3,12). The server 106 may detect the actual position of the third common object pixels 314 within the third pixels 236 as being (2,14) (2,15) (2,16) (2,17) (3,14) (3,15) (3,16) and (3,17). The first common object pixels 310, the second common object pixels 312 and the third common object pixels 314 each comprises an identical number of pixels in FIG. 3 for illustration only. However, in alternative implementations the first common object pixels 310, the second common object pixels 312 and the third common object pixels 314 may each comprise a different number of pixels therebetween without departing from the scope of the present technology.

In some embodiments, the analyzing of the plurality of data clusters 200 by the server 106 may comprise the server 106 being configured to determine whether the first image 300, the second image 302 and the third image 304 have been recorded by the camera 112 in motion. To that end, the server 106 may be configured to compare the first geo-position 222, the second geo-position 224 and the third geo-position 226. For sake of illustration, let's say that by comparing the first geo-position 222, the second geo-position 224 and the third geo-position 226, the server 106 determines that the first geo-position 222, the second geo-position 224 and the third geo-position 226 are identical geo-positions. This means that the camera 112 was not in motion while recording the first image 300, the second image 302 and the third image 304.

In this case, the server 106 may be configured to compute a common object motion information based on the actual position of the first common object pixels 310, the actual position of the second common object pixels 312, the first timestamp 212 and the second timestamp 214. The common object motion information may be representative of a movement pattern of the common object 63 between a position of the common object 63 in the first image 300 and a position of the common object 63 in the second image 302.

In order to compute the common object motion information of the common object 63, the server 106 may be configured to execute a plurality of functions based on kinematic analysis. Generally speaking, kinematic analysis relates to a branch of classic mechanics which describes motion of points. The kinematic analysis may begin with inputs of a geometrical system and initial conditions of known values of position, velocity and/or acceleration of various points that are a part of the geometrical system. Then, based on the inputs, the kinematic analysis may determine a predicted position, a predicted velocity and/or a predicted acceleration of any part of the geometrical system.

For example, the server 106 may be configured to input the actual position of the first common object pixels 310, the actual position of the second common object pixels 312, the first timestamp 212 and the second timestamp 214 into the plurality of functions in order to determine an instant velocity of the common object 63 at a time corresponding to the second timestamp 214 (i.e., the time when the second image 302 has been recorded by the camera 112). The instant velocity of the common object 63 at the time corresponding to the second timestamp 214 may be defined in a pixel coordinates referential of any one of the first image 300 and the second image 302. It should be noted that the instant velocity of the common object 63 may not be the only common object motion information being computed by the server 106 without departing from the scope of the present technology. As mentioned above, the common object motion information may be for example positions and/or accelerations of the common object 63. The execution of the plurality of functions based on kinematic analysis and some implementations thereof now will be explained in greater detail.

For instance, the actual position of the second common object pixels 312 in the second image 302 have moved with respect to the first common object pixels 310 in the first image 300 by (0,7) pixels. A difference between the second timestamp 214 being 15 seconds and the first timestamp 212 being 10 seconds is 5 seconds. Hence, the server 106 may execute the plurality of functions in order to compute that the instant velocity of the common object 63, at the time corresponding to the second timestamp 214, is (0,1.4) pixels/second. In this example, the first timestamp 212 being 10 seconds and the second timestamp 214 being 15 seconds correspond to relative measures of time. However, in other embodiments, the first timestamp 212 and the second timestamp 214 may correspond to absolute measures of time without deviating from the scope of the present technology.

In some embodiments of the present technology, the server 106 may be configured to compute an estimated position of the third common object pixels 314 within the third pixels 236 based on the common object motion information, the third timestamp 216 and the third pixels 236. The server 106 may compute the estimated position of the third common object pixels 314 within the third pixels 236 by inputting the common object motion information, the third timestamp 216 and the third pixels 236 into the plurality of functions which are based on kinematic analysis. Based on a pixel coordinates referential of the third image 304 (e.g., inputted third pixels 236), the plurality of functions may output the estimated position of the third common object pixels 314 within the third image 304 at a time corresponding to the third timestamp 216.

In this case, the instant velocity of the common object 63 at the time corresponding to the second timestamp 214 is (0,1.4) pixels/second. The server 106 may calculate a difference of 5 seconds between the third timestamp 216 (i.e., 20 seconds) and the second timestamp 214 (i.e., 15 seconds). The server 106 may determine that the common object 63 may have moved by (0,7) pixels between the time corresponding to the second timestamp 214 and the time corresponding to the third timestamp 216. Therefore, the server 106 may compute the estimated position of the third common object pixels 314 within the third pixels 236 as being (2,16) (2,17) (2,18) (2,18) (3,16) (3,17) (3,18) and (3,19).

In other words, the estimated position of the third common object pixels 314 within the third pixels 236 should be a position of the third common object pixels 314 within the third pixels 236 if the common object 63 constantly maintains the instant velocity at the time of the second timestamp 214 until the time corresponding to the third timestamp 216. In other embodiments, this means that the estimated position of the third common object pixels 314 within the third pixels 236 should be the position of the third common object pixels 314 within the third pixels 236 if the common object 63 traveled at an average acceleration of zero between the time corresponding to the second timestamp 214 and the time corresponding to the third timestamp 216.

In other embodiments of the present technology, the server 106 may be configured to determine if the actual position of the third common object pixels 314 and the estimated position of the third common object pixels 314 match. In other words, the server 106 may be configured to verify whether the common object 63 actually traveled with the average acceleration of zero between the time corresponding to the second timestamp 214 at the time corresponding to the third timestamp 216.

For example, the server 106 may compare the actual position of the third common object pixels 314 being (2,14) (2,15) (2,16) (2,17) (3,14) (3,15) (3,16) and (3,17) within the third pixels 236 with the estimated position of the third common object pixels 314 being (2,16) (2,17) (2,18) (2,19) (3,16) (3,17) (3,18) and (3,19).

In some embodiments, in response to the actual position of the third object pixels 314 and the estimated position of the third object pixels 314 not matching, the server 106 may determine that an instant velocity of the common object 63 at the time corresponding to the third timestamp 216 is distinct from the instant velocity of the common object 63 at the time corresponding to the second timestamp 214.

In other embodiments, in response to the actual position of the third object pixels 314 and the estimated position of the third object pixels 314 matching, the server 106 may determine that the instant velocity of the common object 63 at the time corresponding to the third timestamp 216 is identical from the instant velocity of the common object 63 at the time corresponding to the second timestamp 214.

As previously mentioned, the server 106 may be configured to determine the new image capturing frequency based on the common object information of the common object 63. In some embodiments, determining the new image capturing frequency may comprise the server 106 being configured to increase the image capturing frequency of the camera 112 in response to the instant velocity of the common object 63 at the time corresponding to the second timestamp 214 being superior to an instant velocity threshold. In other embodiments, determining the new image capturing frequency may comprise the server 106 being configured to decrease the image capturing frequency of the camera 112 in response to the instant velocity of the common object 63 at the time corresponding to the second timestamp 214 being inferior to the instant velocity threshold. In some embodiments, the instant velocity threshold may be an instant velocity norm threshold. In other words, the instant velocity norm threshold may be compared to the instant velocity norm, as opposed to the instant velocity, in order to determine the new image capturing frequency.

For example, in the first scenario, the instant velocity of the common object 63 at the time corresponding to the second timestamp 214 is (0,1.4) pixels/second. Let's assume that the instant velocity norm threshold is 1 pixel/second. In this case, the server 106 may increase the image capturing frequency of the camera 112 since the instant velocity norm of the common object 63 is 1.4 pixels/second and therefore is superior to the instant velocity norm threshold. In another instance, if the instant velocity norm threshold is 2 pixels/second, the server 106 may decrease the image capturing frequency of the camera 112 since the instant velocity norm of the common object 63 is 1.4 pixels/second and therefore is inferior to the instant velocity norm threshold.

In some embodiments, the server 106 being configured to determine the new image capturing frequency based on the common object information of the common object 63 may allow optimizing storage resources. Generally speaking, if objects are moving slowly in front of the camera 112, fewer images are required for capturing the objects' movements and therefore fewer images ought to be recorded by the camera 112 and sequentially stored within the database 108 by the server 106.

However, if the objects are moving fast in front of the camera 112, more images are required for recording the objects' movements and, therefore, more images ought to be recorded by the camera 112. Hence, in other embodiments, the server 106 being configured to determine the new image capturing frequency based on the common object information of the common object 63 may allow having a good trade-off between recording objects' movements and the storage resources of the recorded images.

In the additional embodiments, the server 106 may be configured to send the indication of the new image capturing frequency to the camera 112 via the network 110. In response, the camera 112 may be configured to capture new images according to the new image capturing frequency.

In additional embodiments, in response to the actual position of the third common object pixels 314 and the estimated position of the third common object pixels 314 not matching, the server 106 may be configured to generate a synthetic image 306 based on the third image 304 and at least one of the first image 300 and the second image 302. The synthetic image 306 may comprise at least the third common object pixels 314 and correction pixels 320. In another embodiment, the synthetic image 306 may be a panoramic image. How the server 106 may generate the synthetic image 306 will now be described with reference to FIG. 4.

Figure 4:
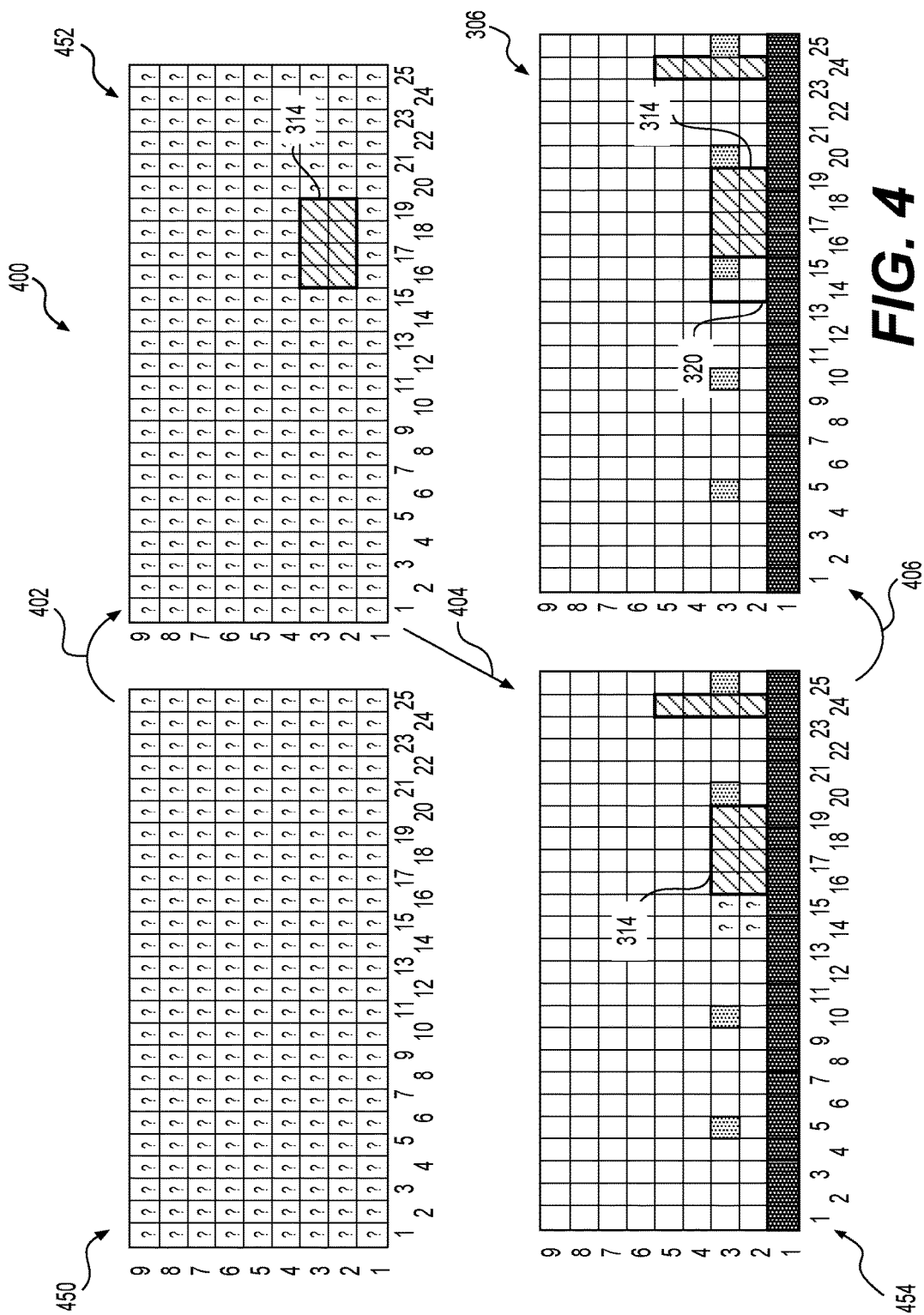
FIG. 4 depicts the synthetic image generation procedure executed by a server of FIG. 1 for generating the synthetic image of FIG. 3 in some embodiments of the present technology.

In some embodiments, the server 106 may be configured to execute a synthetic image generation procedure 400 depicted in FIG. 4. To that end, the server 106 may be configured to generate a first rendered state 450 of the synthetic image 306. In order to generate the first rendered state 450, the server 106 may identify a pixel coordinates referential of the third image 304. In other words, the first rendered state 405 of the synthetic image 306 may include a map of empty pixel positions of the third pixels 236.

The server 106 may be configured to apply a first pixel assigning process 402 to the first rendered state 450 in order to obtain a second rendered state 452 of the synthetic image 306. In some embodiments, during the execution of the first pixel assigning process 402, the server 106 may be configured to assign the estimated position of the third common object pixels 314 to the third common object pixels 314 within the synthetic image 306. In other words, the server 106 may select the third common object pixels 314 and assign to them the estimated position being (2,16) (2,17)

(2,18) (2,19) (3,16) (3,17) (3,18) and (3,19) within the first rendered state 450 in order to generate the second rendered state 452 of the synthetic image 306.

The server 106 may be configured to apply a second pixel assigning process 404 to the second rendered state 452 in order to obtain a third rendered state 454 of the synthetic image 306. In some embodiments, during the execution of the second pixel assigning process 404, the server 106 may identify background pixel positions and the respective background pixels within the third image 304. The background pixel positions are all pixel positions within the third image 304 except pixel positions corresponding to the actual pixel position of the third common object pixels 314 and the estimated position of the third common object pixels 314. In this case, all the background pixel positions are all the pixels positions within the third image 304 with exception of the pixel positions (2,16) (2,17) (2,18) (2,19) (3,16) (3,17) (3,18) (3,19) (2,14) (2,15) (3,14) and (3,15). Therefore, the background pixels are all the pixels within the third image respectively corresponding to the background pixels positions (i.e., all the pixel positions except the pixel positions (2,16) (2,17) (2,18) (2,19) (3,16) (3,17) (3,18) (3,19) (2,14) (2,15) (3,14) and (3,15)). The server 106 may be configured to assign all the background pixels to their respective background pixel positions within the second rendered state 452 in order to generate the third rendered state 454 of the synthetic image 306.

In further embodiments, the server 106 may be configured to execute a correction verification routine on the third rendered state 454 of the synthetic image 306. The correction verification routine may allow the server 106 to determine which regions and/or sections of the third rendered state 454 need to be corrected in order to generate the synthetic image 306. During the correction verification routine, the server 106 may be configured to parse through each pixel position of the third rendered state 454 of the synthetic image 306 in order to determine which pixel positions are not assigned with pixels from the third image 304. The pixel positions that are not assigned with pixels from the third image 304 are identified by the server 106 as correction pixel positions.

The correction pixel positions within the third rendered state 454 of the synthetic image 306 may not be assigned with pixels from the third image 304 for different reasons. In some cases, the first pixel assigning process 402 may incorrectly assigned third common pixels 314 to the estimated pixel position of the third common object pixels 314 within the first rendered state 450 of the synthetic image 306. In other cases, the second pixel assigning process 404 may incorrectly assigned the background pixels to the respective background pixel positions within the second rendered state 452 of the synthetic image 306. In further cases, the correction pixel positions may not be assigned with respective pixels within the third pixels 236 because the respective pixels in question may be corrupted or lost or the like. In additional cases, the correction pixel positions within the third rendered state 454 of the synthetic image 306 may not be assigned with respective pixels from the third image 304 because the correction pixel positions correspond to the actual position of the third common object pixels 314 within the third rendered state 454 of the synthetic image 306.

The server 106 may be configured to parse through each pixel position of the third rendered state 454 and determine that the correction pixel positions are (2,14) (2,15) (3,14) and (3,15) (i.e., at least some pixel positions amongst the actual pixel position of the third common object pixels 314 within the third image 304). In some embodiments of the present technology, the server 106 may be configured to determine the correction pixels 320. The server 106 may determine the correction pixels 320 based on the correction pixel positions identified during the correction verification routine and at least one of the first image 300 and the second image 302. In other embodiments, the server 106 may be configured to determine the correction pixels 320 based on the actual position of the third common object pixels 314 within the third image 304 and at least one of the first image 300 and the second image 302.

The server 106 may determine the correction pixels 320 by identifying pixels within the first image 300 and/or the second image 302 that are assigned to the correction pixel positions within the first image 300 and/or the second image 302. In other embodiments, the server 106 may determine the correction pixels 320 by identifying pixels within the first image 300 and/or the second image 302 that are assigned to the actual pixel position of the third common object pixels 314 within the first image 300 and/or the second image 302.

In further embodiments, the server 106 may be configured to apply a final assigning process 406 to the third rendered state 454 in order to generate the synthetic image 306. During the final assigning process 406, the server 106 may assign the correction pixels 320 to the correction pixel positions within the third rendered state 454. As previously mentioned, in this case the server 106 may assign the correction pixels 320, which correspond to pixels assigned to the correction pixel positions (2,14) (2,15) (3,14) and (3,15) within the first image 300 and/or the second image 302, to the corrections pixel positions (2,14) (2,15) (3,14) and (3,15) within the third rendered state 454 in order to generate the synthetic image 306.

As previously alluded to, the camera 112 may be mounted on the moving vehicle 502 depicted in FIG. 5. In such a case, the camera 112 may be in motion since the moving vehicle 502 may be in motion. In FIG. 5 there is depicted a first aerial view 500, a second aerial view 550 and a third aerial view 580 wherein the first aerial view 500, the second aerial view 550 and the third aerial view 580 are sequential in time.

Positions of the common object 63 and of the camera 112 in the first aerial view 500 are different from positions of the common object 63 and of the camera 112 in the second aerial view 550. Further, the positions of the common object 63 and of the camera 112 in the second aerial view 550 are different from positions of the common object 63 and of the camera 112 in the third aerial view 580. In such a case, the common object 63 and the camera 112 are in motion. Hence, a distinct first image (not depicted), a distinct second image (not depicted) and a distinct third image (not depicted) may be captured by the camera 112 in motion respectively at a time corresponding to the first aerial view 500, the second aerial view 550 and the third aerial view 580.

In some embodiments, the camera data packet 170 may comprise a camera motion information associated with the camera 112 in motion. In this case, the server 106 may receive the camera motion information from the camera 112 and may compute the object motion information further based on the camera motion information. For example, the camera motion information may be inputted into the plurality of functions which output the object motion information.

In other embodiments, a distinct first geo-position of the camera 112 associated with the distinct first image may be different from a distinct second geo-position of the camera 112 associated with the distinct second image. Also, the distinct second geo-position of the camera 112 associated with the distinct second image may be different from a distinct third geo-position of the camera 112 associated with the distinct third image. The server 106 may receive the camera data packet 170 comprising the distinct first geo-position of the camera 112 associated with the distinct first image, the distinct second geo-position of the camera 112 associated with the distinct second image and the distinct third geo-position of the camera 112 associated with the distinct third image.

In additional embodiments, the server 106 may be configured to compute the camera motion information based on the distinct first geo-position of the camera 112, the distinct second geo-position of the camera 112 and the distinct third geo-position of the camera 112. In this case, after computing the camera motion information, the server 106 may be configured to compute the object motion information further based on the camera motion information.

Second Scenario

Figure 6:
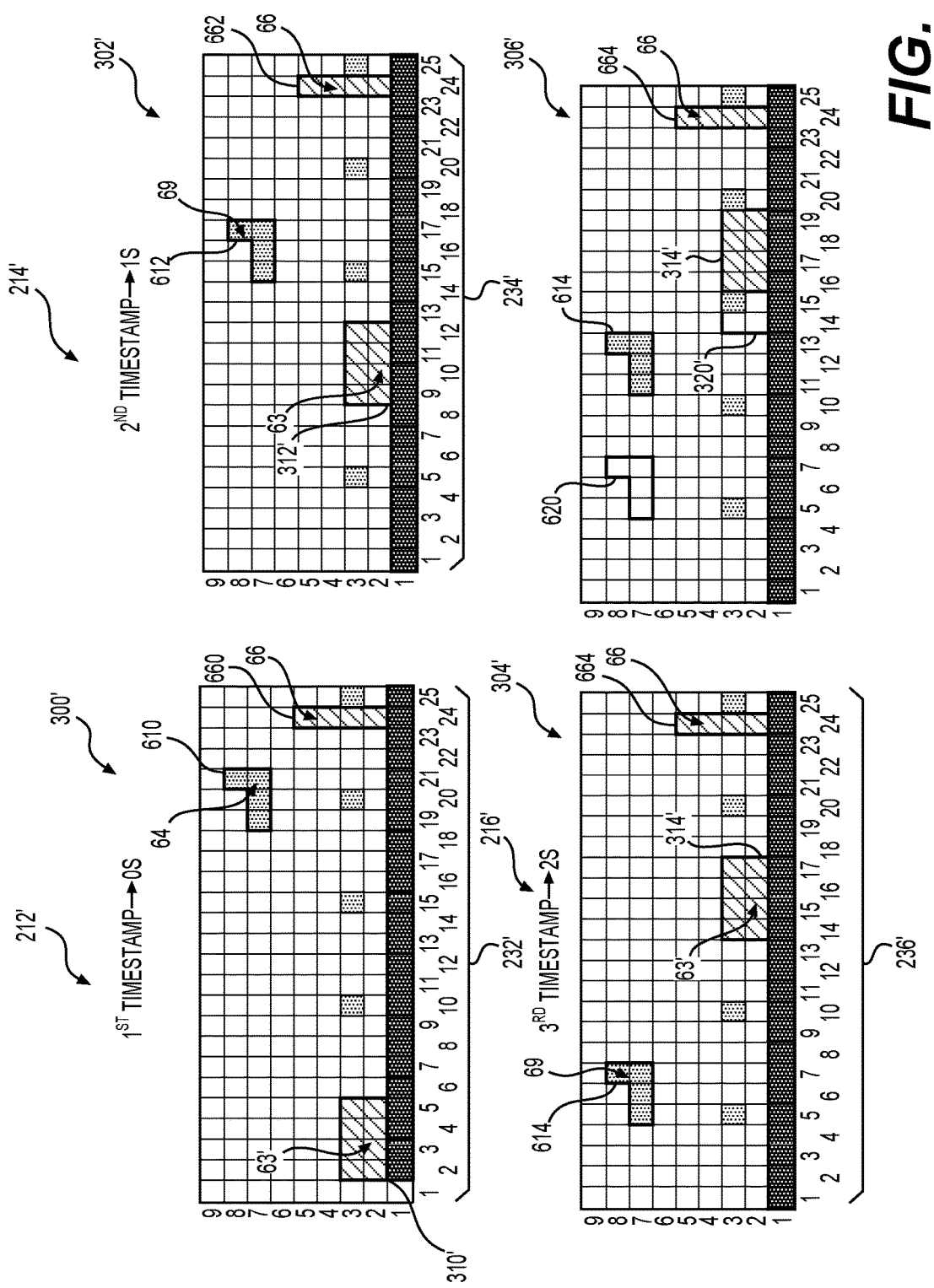
FIG. 6 depicts a first image, a second image and a third image captured and recorded by a camera of FIG. 1 in a second scenario and a synthetic image generated by a server of FIG. 1 in some implementations of the present technology.

In a second scenario and referring to FIG. 6, the camera 112 may have recorded the first image 300', the second image 302' and the third image 304' in the sequential manner. In other embodiments, the camera 112 may have recorded the first image 300', the second image 302' and the third image 304' in the consecutive manner.

In some embodiments, the server 106 may be configured to determine an actual position of first common object pixels 310' within first pixels 232', an actual position of second common object pixels 312' within second pixels 234' and an actual position of third common object pixels 314' within third pixels 236'. In this case, the first common object pixels 310', the second common object pixels 312' and the third common object pixels 314' may be associated with a common object 63' in the first image 300', the second image 302' and the third image 304' respectively, such as depicted in FIG. 6. To that end, the server 106 may be configured to detect the common object 63' in the first image 300', the second image 302' and the third image 304'.

In some embodiments, the server 106 may be configured to determine an actual position of first different object pixels 610 within first pixels 232', an actual position of second different object pixels 612 within second pixels 234' and an actual position of third different object pixels 614 within third pixels 236'. In this case, the first different object pixels 610, the second different object pixels 612 and the third different object pixels 614 may be associated with a different object 69 in the first image 300', the second image 302' and the third image 304' respectively, such as depicted in FIG. 6. To that end, the server 106 may be configured to detect the different object 69 in the first image 300', the second image 302' and the third image 304'. It should be noted that the detection of the different object 69 and the common object 63' may be performed by the server 106 via the plurality of object recognition techniques similarly to the detection of the common object 63 in FIG. 3.

In alternative embodiments, the server 106 may be configured to determine an actual position of first alternative object pixels 660 within first pixels 232', an actual position of second alternative object pixels 662 within second pixels 234' and an actual position of third alternative object pixels 664 within third pixels 236'. In this case, the first alternative object pixels 660, the second alternative object pixels 662 and the third alternative object pixels 664 may be associated with an alternative object 66 in the first image 300', the second image 302' and the third image 304' respectively, such as depicted in FIG. 6. To that end, the server 106 may be configured to detect the alternative object 66 in the first image 300', the second image 302' and the third image 304'. It should be noted that the detection of the alternative object 66, the different object 69 and the common object 63' may be performed by the server 106 via the plurality of object recognition techniques similarly to the detection of the common object 63 in FIG. 3.

In the non-limiting example of FIG. 6, the server 106 may detect the actual position of the first common object pixels 310' within the first pixels 232' as being (2,2) (2,3) (2,4) (2,5) (3,2) (3,3) (3,4) and (3,5). The server 106 may detect the actual position of the second common object pixels 312' within the second pixels 234' as being (2,9) (2,10) (2,11) (2,12) (3,9) (3,10) (3,11) and (3,12). The server 106 may detect the actual position of the third common object pixels 314' within the third pixels 236' as being (2,14) (2,15) (2,16) (2,17) (3,14) (3,15) (3,16) and (3,17).

In the non-limiting example of FIG. 6, the server 106 may detect the actual position of the first different object pixels 610 within the first pixels 232' as being (7,19) (7,20) (7,21) and (8,21). The server 106 may detect the actual position of the second different object pixels 612 within the second pixels 234' as being (7,15) (7,16) (7,17) and (8,17). The server 106 may detect the actual position of the third different object pixels 614 within the third pixels 236' as being (7,5) (7,6) (7,7) and (8,7).

In alternative embodiments, the server 106 may further detect the actual position of the first alternative object pixels 660 within the first pixels 232' as being (2,24) (3,24) (4,24) and (5,24). The server 106 may detect the actual position of the second alternative object pixels 662 within the second pixels 234' as being (2,24) (3,24) (4,24) and (5,24). The server 106 may detect the actual position of the third alternative object pixels 664 within the third pixels 236' as being (2,24) (3,24) (4,24) and (5,24).

For sake of illustration, let's say that the camera 112 was not in motion while recording the first image 300', the second image 302' and the third image 304'.

In this case, the server 106 may be configured to compute the common object motion information based on the actual position of the first common object pixels 310', the actual position of the second common object pixels 312', the first timestamp 212' and the second timestamp 214'. The common object motion information may be representative of a movement pattern of the common object 63' between a position of the common object 63' in the first image 300' and a position of the common object 63' in the second image 302'.

Also, the server 106 may be configured to compute a different object motion information based on the actual position of the first different object pixels 610, the actual position of the second different object pixels 612, the first timestamp 212' and the second timestamp 214'. The different object motion information may be representative of a movement pattern of the different object 69 between a position of the different object 69 in the first image 300' and a position of the different object 69 in the second image 302'.

Also, the server 106 may be configured to compute an alternative object motion information based on the actual position of the first alternative object pixels 660, the actual position of the second alternative object pixels 662, the first timestamp 212' and the second timestamp 214'. The alternative object motion information may be representative of a movement pattern of the alternative object 66 between a position of the alternative object 66 in the first image 300' and a position of the alternative object 66 in the second image 302'.

In order to compute the common object motion information of the common object 63', the different object motion information of the different object 69 and of the alternative object motion information of the alternative object 66 the server 106 may be configured to execute the plurality of functions based on kinematic analysis similarly to the computation of the common object motion information of the common object 63 in the first scenario.

For instance, the server 106 may execute the plurality of functions in order to compute that an instant velocity of the common object 63', at a time corresponding to the second timestamp 214', is (0,7) pixels/second. The server 106 may execute the plurality of functions in order to compute that an instant velocity of the different object 69, at a time corresponding to the second timestamp 214', is (0,−4) pixels/second. The server 106 may execute the plurality of functions in order to compute that an instant velocity of the alternative object 66, at a time corresponding to the second timestamp 214', is (0,0) pixels/second.

In some embodiments of the present technology, the server 106 may be configured to determine a motion state of the common object 63' based on the common object motion information of the common object 63'. The server 106 may determine that the motion state of the common object 63' is dynamic or static. The server 106 may be configured to determine a motion state of the different object 69 based on the different object motion information of the different object 69. The server 106 may determine that the motion state of the different object 69 is dynamic or static. The server 106 may be configured to determine a motion state of the alternative object 66 based on the alternative object motion information of the alternative object 66. The server 106 may determine that the motion state of the alternative object 66 is dynamic or static.

In additional embodiments, the motion state of at least one of the common object 63', the different object 69 and the alternative object 66 may be stored by the server 106 within the database 108. In other implementations, the motion state of at least one of the common object 63', the different object 69 and the alternative object 66 may be sent via the network 110 to the camera 112 and/or to the client device 102. It should be noted that the determination of the motion state of at least one of the common object 63', the different object 69 and the alternative object 66 may reduce an amount of computational resources of the server 106 needed for generating the synthetic image 306'. As will be described further below, determining that the motion state of the alternative object 66 is static may reduce the amount of computational resources of the server 106 for the generation of the synthetic image 306'.

For example, the server 106 may determine that the motion state of the common object 63' is dynamic since the instant velocity of the common object 63' at the time corresponding to the second timestamp 214' is not a zero vector. In another example, the server 106 may determine that the motion state of the common object 63' is dynamic since a norm of the instant velocity of the common object 63' is not equal to zero at the time corresponding to the second timestamp 214'. Similarly, the server 106 may determine that the motion state of the different object 69 is dynamic since the instant velocity of the different object 69 at the time corresponding to the second timestamp 214' is not the zero vector. In another example, the server 106 may determine that the motion state of the different object 69 is dynamic since a norm of the instant velocity of the different object 69 is not equal to zero at the time corresponding to the second timestamp 214'. In an alternative example, the server 106 may determine that the motion state of the alternative object 66 is dynamic since a norm of the instant velocity of the different object 69 is equal to zero at the time corresponding to the second timestamp 214'.

In other embodiments, in response to the motion state of the common object 63' being dynamic, the server 106 may be configured to compute an estimated position of the third common object pixels 314' within the third pixels 236' based on the common object motion information of the common object 63', the third timestamp 216' and the third pixels 236'. Also, in response to the motion state of the different object 69 being dynamic, the server 106 may be configured to compute an estimated position of the third different object pixels 614 within the third pixels 236' based on the different object motion information, the third timestamp 216' and the third pixels 236'.

Further, in response to the motion state of the alternative object 66 being static, the server 106 may be configured not to compute an estimated position of the third alternative object pixels 664 within the third pixels 236' based on the alternative object motion information, the third timestamp 216' and the third pixels 236'. For example, in response to the motion state of the alternative object 66 being static, the server 106 may be configured to identify the third alternative object pixels 664 within third pixels 236' as being part of background pixels of the third image 304'. Identifying the third alternative object pixels 664 within third pixels 236' as being part of background pixels of the third image 304' may result in the server 106 not computing an actual and/or estimated position of the third alternative object pixels 664 position within the third image 304' and in the server 106 not determining correction pixel positions for the third alternative object pixels 664 within the synthetic image 306'.

The server 106 may compute the estimated position of the third common object pixels 314' within the third pixels 236' by inputting the common object motion information of the common object 63', the third timestamp 216' and the third pixels 236' into the plurality of functions which are based on kinematic analysis. Based on a pixel coordinates referential of the third image 304' (e.g., inputted third pixels 236'), the plurality of functions may output the estimated position of the third common object pixels 314' at a time corresponding to the third timestamp 216'. Similarly, the server 106 may compute the estimated position of the third different object pixels 614 within the third pixels 236' by inputting the different object motion information, the third timestamp 216' and the third pixels 236' into the plurality of functions.

In this scenario, the server 106 may compute the estimated position of the third common object pixels 314' within the third pixels 236' as being (2,16) (2,17) (2,18) (2,18) (3,16) (3,17) (3,18) and (3,19). Moreover, the server 106 may compute the estimated position of the third different object pixels 614 within the third pixels 236' as being (7,11) (7,12) (7,13) and (8,13).

In other words, the estimated position of the third common object pixels 314' within the third pixels 236' should be a position of the third common object pixels 314' within the third pixels 236' if the common object 63' constantly maintains the instant velocity at the time of the second timestamp 214' until the time corresponding to the third timestamp 216'. In other embodiments, this means that the estimated position of the third common object pixels 314' within the third pixels 236' should be the position of the third common object pixels 314' within the third pixels 236' if the common object 63' is travelling at an average acceleration of zero between the time corresponding to the second timestamp 214' at the time corresponding to the third timestamp 216'.

Similarly, the estimated position of the third different object pixels 614 within the third pixels 236' should be a position of the third different object pixels 614 within the third pixels 236' if the different object 69 constantly maintains the instant velocity at the time of the second timestamp 214' until the time corresponding to the third timestamp 216'. In other embodiments, this means that the estimated position of the third different object pixels 614 within the third pixels 236' should be the position of the third different object pixels 614 within the third pixels 236' if the different object 69 is travelling at an average acceleration of zero between the time corresponding to the second timestamp 214' at the time corresponding to the third timestamp 216'.

In other embodiments of the present technology, the server 106 may be configured to determine if the actual position of the third common object pixels 314' and the estimated position of the third common object pixels 314' match. The server 106 may also be configure to determine if the actual position of the third different object pixels 614 and the estimated position of the third different object pixels 614 match.

In additional embodiments, in response to the actual position of the third common object pixels 314' and the estimated position of the third common object pixels 314' not matching, the server 106 may be configured to generate a synthetic image 306' based on the third image 304' and at least one of the first image 300' and the second image 302'.

In yet another embodiment, in response to the actual position of the third common object pixels 314' and the estimated position of the third common object pixels 314' not matching and in response to the actual position of the third different object pixels 614 and the estimated position of the third different object pixels 614 not matching, the server 106 may be configured to generate a synthetic image 306' based on the third image 304' and at least one of the first image 300' and the second image 302'.

It should be noted that, in some implementations, where the motion state of the alternative object 66 is determined to be static, the third alternative object pixels 664 within third pixels 236' may be identified by the server 106 as being part of the background pixels of the third image 304'. Generally speaking, the identification of the third alternative object pixels 664 within third pixels 236' as being part of the background pixels of the third image 304' may result in the server 106 not possessing the third alternative object pixels 664 for computing the estimated position of the third alternative object pixels 664 in the third image 304'. As a result, the server 106 may not need to determine the correction pixel positions of correction pixels for the alternative object 66 since the motion state of the alternative object 66 may be determined to be static. Therefore, determining that the alternative object 66 is static may reduce the amount of computational resources of the server 106 for generating the synthetic image 306' since the alternative object 66 will be treated as a part of the background of the third image 304'.

The synthetic image 306' may comprise at least the third common object pixels 314', correction pixels 320', the third different object pixels 614 and different correction pixels 620. In some embodiments, the server 106 may be configured to generate the synthetic image 306' similarly to how the synthetic image 306 may be generated according the synthetic image generation procedure 400 depicted in FIG. 4.

In other embodiments, the server 106 may be configured to assign the third common object pixels 314' to the estimated position of the third common object pixels 314' within the synthetic image 306'. The server 106 may also be configured to assign the third different object pixels 614 to the estimated position of the third different object pixels 614 within the synthetic image 306'.

In additional embodiments, similarly to how the server 106 may determine the correction pixel positions for the synthetic image 306 and the correction pixels 320 during the synthetic image generation procedure 400, the server 106 may be configured to determine correction pixel positions of the correction pixels 320' and the correction pixels 320' based on the actual position of the third common object pixels 314', the third image 304' and at least one of the first image 300' and the second image 302'. Also similarly to how the server 106 may determine the correction pixel positions for the synthetic image 306 and the corrections pixels 320 during the synthetic image generation procedure 400, the server 106 may be configured to determine different correction pixel position of the different correction pixels 620 and the different correction pixels 620 based on the actual position of the third different object pixels 614, the third image 304' and at least one of the first image 300' and the second image 302'.

In further embodiments, the server 106 may be configured to assign the correction pixels 320' to the actual position of the third common object pixels 314' within the synthetic image 306'. The server 106 may also be configured to assign the different correction pixels to the actual position of the third different object pixels 614 within the synthetic image 306'.

In some embodiments the server 106 may store the first image 300, the second image 302 and at least one of the third image 304 and the synthetic image 306 within the database 108. The server 106 may similarly store the first image 300', the second image 302' and at least one of the third image 304' and the synthetic images 306' within the database 108.

As previously mentioned, in response to receiving the request 150 from the client device 102, the server 106 may be configured to generate and send the client data packet 160 to the client device 102. The client data packet 160 may comprise the first image 300, the second image 302 and the synthetic image 306. In other embodiments, the client data packet may comprise the first image 300', the second image 302' and the synthetic image 306'.

In response to receiving the client data packet 160 via the network 110, the client device 102 may be configured to display at least one of the first image 300, the second image 302 and the synthetic image 306 to the user 104 via the browser application. In other embodiments, the client device 102 may be configured to display at least one of the first image 300', the second image 302' and the synthetic image 306' to the user 104 via the browser application.

In some implementation of the present technology, generating the synthetic image 306 and/or 306' may allow retrieving important and valuable information regarding objects in movement which were captured by the camera 112. In other embodiments, storing the synthetic image 306 instead of the third image 304 may allow augmenting the quality of images with objects in movement without increasing the storage requirements.

Figure 7:
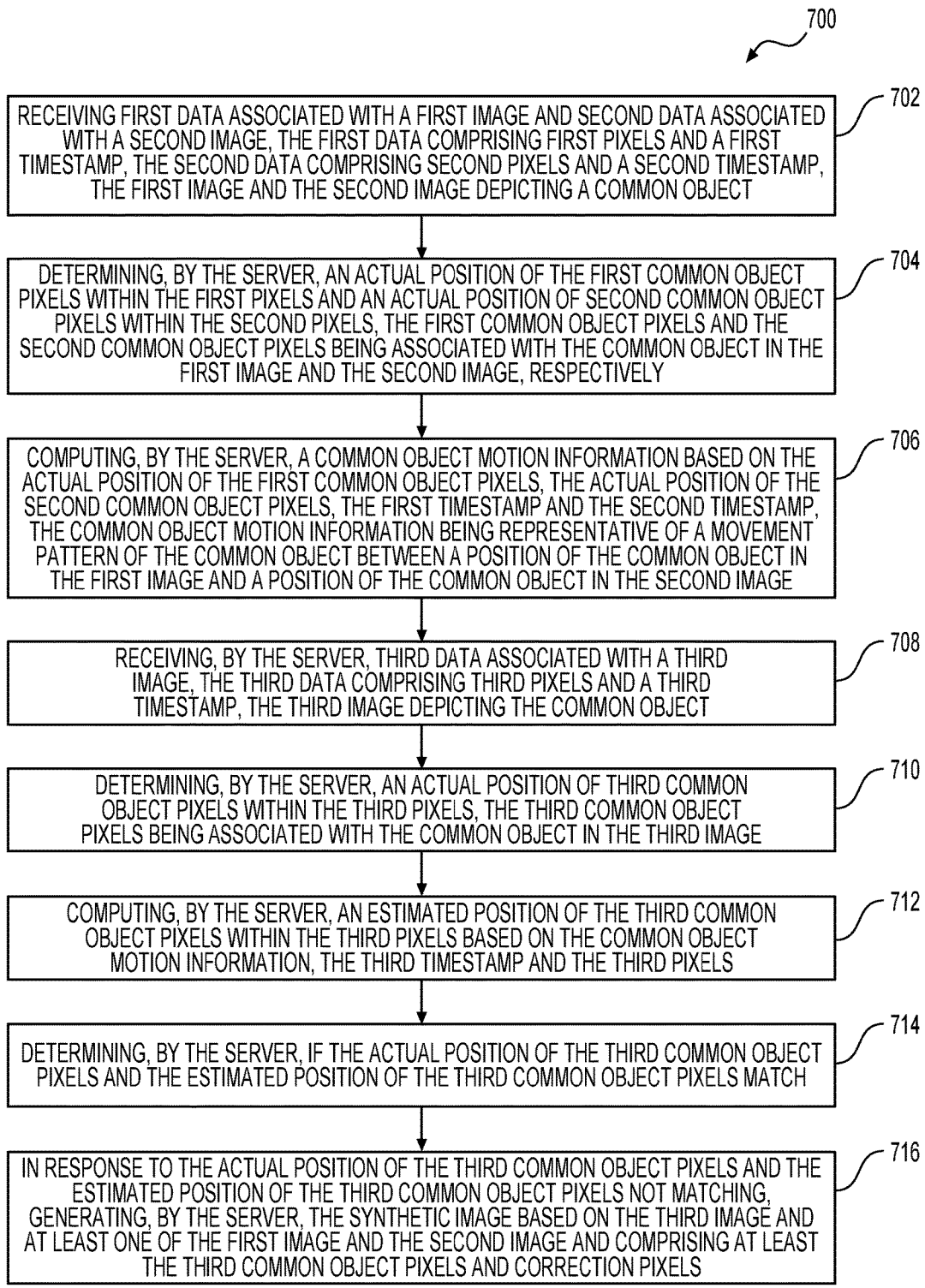
FIG. 7 is a flowchart describing a method of generating a synthetic image that is envisioned is some implementations of the present technology.

In some embodiments of the present technology, the server 106 may be configured to execute a method 700 depicted in FIG. 7 of generating a synthetic image 306. The method 700 will now be described in further detail.

Step 702

The method 700 begins at step 702 with the server 106 receiving the first data 210 associated with the first image 300 and the second data 220 associated with the second image 302 as depicted in FIG. 3.

With reference to FIG. 2, the first data 210 may comprise the first pixels 232 and the first timestamp 212 and the second data 220 may comprise the second pixels 234 and the second timestamp 214. In some embodiments, the first data 210 may further comprise the first geo-position 222 and the second data 220 may further comprise the second geo-position 224. The first image 300 and the second image 302 may depict the common object 63.

Step 704

The method 700 continues with the server 106 determining the actual position of first common object pixels 310 within the first pixels 232 and the actual position of second common object pixels 312 within the second pixels 234.

The server 106 determining the actual position of the first common object pixels 310 and the actual position of the second common object pixels 312 may comprise performing the object recognition technique. It should be noted that the first common object pixels 310 and the second common object pixels 312 are associated with the common object 63 in the first image 300 and the second image 302, respectively.

Step 706

The method 700 continues to step 706 with the server 106 computing the common object motion information of the common object 63 based on the actual position of the first common object pixels 310, the actual position of the second common object pixels 312, the first timestamp 212 and the second timestamp 214.

In some embodiments, the server 106 may compute the common object information of the common object 63 via the plurality of functions that are based on kinematic analysis. The common object motion information may be representative of the movement pattern of the common object 63 between the position of the common object 63 in the first image 300 and the position of the common object 63 in the second image 302.

It should be noted that the instant velocity of the common object 63 may not be the only common object motion information being computed by the server 106 without departing from the scope of the present technology. As mentioned above, the common object motion information may be for example positions and/or accelerations of the common object 63.

Step 708

The method 700 continues to step 708 with the server 106 receiving the third data 230 associated with the third image 304. The third data 230 may comprise the third pixels 236 and the third timestamp 216. In some embodiments, the third data 230 may also comprise the third geo-position 226 such as depicted in FIG. 2. The third image 304 depicts the common object 63.

In some implementations of the present technology, the server 106 may execute the step 708 concurrently to the step 702. For example, the server 106 may receive the camera data packet 170 via the network 110 from the camera 112. The camera data packet 170 may comprise the plurality of data clusters 200 which comprises the first data cluster 202, the second data cluster 204 and the third data cluster 206. The first data cluster 202 may comprise the first data 210, the second data cluster 204 may comprise the second data 220 and the third data cluster 206 may comprise the third data 230.

In other implementations, the server 106 may execute the step 708 after the step 706. For instance, the camera data packet 170 may be the plurality of separate camera data packets received separately in time by the server 106. In such a case, each separate camera data packet within the plurality of separate camera data packets may comprise a respective data cluster within the plurality of data clusters 200 for allowing the server 106 executing the step 702 and 708 sequentially and not concurrently.

Step 710

The method 700 continues to step 710 with the server 106 determining the actual position of third common object pixels 314 within the third pixels 236. The third common object pixels 314 being associated with the common object 63 in the third image 304.

The server 106 determining the actual position of the third common object pixels 314 may comprise performing the object recognition technique. For example, the object recognition technique may be any recognition technique amongst the plurality of object recognition techniques. The plurality of object recognition techniques may include edge detection, recognition by parts, the appearance-based methods and the feature-based methods.

Step 712

The method 700 continues to step 712 with the server 106 computing the estimated position of the third common object pixels 314 within the third pixels 236 based on the common object motion information, the third timestamp 216 and the third pixels 236.

In some embodiments of the present technology, the server 106 may compute the estimated position of the third common object pixels 314 within the third pixels 236 via the plurality of functions that are based on kinematic analysis. The estimated position of the third common object pixels 314 within the third pixels 236 should be the position of the third common object pixels 314 within the third pixels 236 if the common object 63 traveled at the average acceleration of zero between the time corresponding to the second timestamp 214 and the time corresponding to the third timestamp 216.

Step 714

The method 700 continues to step 714 with the server 106 determining if the actual position of the third common object pixels 314 and the estimated position of the third common object pixels 314 match.

In other embodiments, in response to the actual position of the third object pixels 314 and the estimated position of the third object pixels 314 matching, the server 106 may determine that the instant velocity of the common object 63 at the time corresponding to the third timestamp 216 is identical from the instant velocity of the common object 63 at the time corresponding to the second timestamp 214.

In additional embodiments, the server 106 may be configured to determine the new image capturing frequency based on the common object information of the common object 63. In some embodiments, determining the new image capturing frequency may comprise the server 106 being configured to increase the image capturing frequency of the camera 112 in response to the instant velocity of the common object 63 at the time corresponding to the second timestamp 214 being superior to the instant velocity threshold. In other embodiments, determining the new image capturing frequency may comprise the server 106 being configured to decrease the image capturing frequency of the camera 112 in response to the instant velocity of the common object 63 at the time corresponding to the second timestamp 214 being inferior to the instant velocity threshold.

In alternative embodiments, the server 106 may send the indication of the new image capturing frequency to the camera 112 via the network 110. In response, the camera 112 may begin capturing and recording the new images according to the new image capturing frequency.

Step 716

The method 700 ends at step 716 with the server 106, in response to the actual position of the third common object pixels 314 and the estimated position of the third common object pixels 314 not matching, generating the synthetic image 306 based on the third image 304 and at least one of the first image 300 and the second image 302.

In some embodiments, the synthetic image 306 may comprise at least the third common object pixels 314 and the correction pixels 320. The generating the synthetic image 306 may comprise the server 106 executing the synthetic image generation procedure 400 depicted in FIG. 4. For instance, the server 106 may generate the first rendered state 450, the second rendered state 452 and the third rendered state 454 of the synthetic image 306 in order to generate the synthetic image 306.

In other embodiments, the server 106 may execute the correction verification routine on the third rendered state 454 of the synthetic image in order to determine the correction pixel positions of the correction pixels 320.

In additional embodiments, at least some of the correction pixel positions of the correction pixels 320 may be the at least some pixel positions within the actual position of the third common object pixels 314 within the third image 304 such as depicted in FIG. 3.

In alternative embodiments, the server 106 generating the synthetic image 306 may comprise assigning the third common object pixels 314 to the estimated position of the third common object pixels 314 within the synthetic image 306.

In yet another embodiment, the server 106 generating the synthetic image 306 may comprise determining the correction pixel positions of the correction pixels 320 and the correction pixels 320 based on the actual position of the third common object pixels 314 and at least one of the first image 300 and the second image 302.

In another implementation, the server 106 generating the synthetic image 306 may comprise assigning the correction pixels 320 to the correction pixel positions of the correction pixels 320 within the synthetic image 306.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What I claim is:

1. A method of generating a synthetic image, the method executable at a server, the method comprising:

receiving, by the server, first data associated with a first image and second data associated with a second image, the first data comprising first pixels and a first timestamp, the second data comprising second pixels and a second timestamp, the first image and the second image depicting a common object;

determining, by the server, an actual position of first common object pixels within the first pixels and an actual position of second common object pixels within the second pixels, the first common object pixels and the second common object pixels being associated with the common object in the first image and the second image, respectively;

computing, by the server, a common object motion information based on the actual position of the first common object pixels, the actual position of the second common object pixels, the first timestamp and the second timestamp, the common object motion information being representative of a movement pattern of the common object between a position of the common object in the first image and a position of the common object in the second image;

receiving, by the server, third data associated with a third image, the third data comprising third pixels and a third timestamp, the third image depicting the common object, the third image having been captured after the second image, and the second image having been captured after the first image in a sequential manner, with a time delay between the end of capturing of one image and beginning of capturing of a following image in the sequence is at least zero seconds;

determining, by the server, an actual position of third common object pixels within the third pixels, the third common object pixels being associated with the common object in the third image;

computing, by the server, an estimated position of the third common object pixels within the third pixels based on the common object motion information, the third timestamp and the third pixels;

determining, by the server, if the actual position of the third common object pixels and the estimated position of the third common object pixels match; and in response to the actual position of the third common object pixels and the estimated position of the third common object pixels not matching, generating, by the server, the synthetic image based on the third image and at least one of the first image and the second image and comprising at least the third common object pixels and correction pixels, the generating comprises:

assigning, by the server, the third common object pixels to the estimated position of the third common object pixels within the synthetic image;

determining, by the server, correction pixel positions of the correction pixels by parsing the synthetic image to determine pixel positions that have been left blank after the assigning the third common object pixels;

determining, by the server, the correction pixels by identifying pixels within at least one of the first image and the second image to be assigned to the pixel positions that have been left blank in the synthetic image; and assigning, by the server, the correction pixels to the correction pixel positions of the correction pixels within the synthetic image.

2. The method of claim 1, wherein at least some of the correction pixel positions of the correction pixels are at least some pixel positions within the actual position of the third common object pixels within the third image.

3. The method of claim 1, wherein the first image, the second image and the third image are captured by a camera in motion, and wherein the first data, the second data and the third data is received by the server from the camera and wherein the method further comprises:

receiving, by the server, camera motion information associated with the camera in motion; and wherein the common object motion information is further based on the camera motion information.

4. The method of claim 1, wherein at least one of the first image, the second image, the third image and the synthetic image is a panoramic image.

5. The method of claim 1, wherein the method further comprises:

in response to the actual position of the third object pixels and the estimated position of the third object pixels not matching, determining, by the server, that an instant velocity of the common object at a time corresponding to the third timestamp is distinct from an instant velocity of the common object at a time corresponding to the second timestamp; and storing, by the server, the instant velocity of the common object at the time corresponding to the third timestamp and the instant velocity of the common object at the time corresponding to the second timestamp.

6. The method of claim 3, wherein the first image and the second image further depict, in addition to the common object, a different object, the method comprises:

determining, by the server, the actual position of first common object pixels within the first pixels and the actual position of second common object pixels within the second pixels, the first common object pixels and the second common object pixels being associated with the common object in the first image and the second image, respectively;

determining, by the server, an actual position of first different object pixels within the first pixels and an actual position of second different object pixels within the second pixels, the first different object pixels and the second different object pixels being associated with the different object in the first image and the second image, respectively;

computing, by the server, the common object motion information based on the actual position of the first common object pixels, the actual position of the second common object pixels, the first timestamp and the second timestamp;

computing, by the server, a different object motion information based on the actual position of the first different object pixels, the actual position of the second different object pixels, the first timestamp and the second timestamp;

determining, by the server, a motion state of the common object based on the common object motion information; and determining, by the server, a motion state of the different object based on the different object motion information.

7. The method of claim 6, wherein in response to the motion state of the common object being dynamic, the method further comprises:

computing, by the server, the estimated position of the third common object pixels within the third pixels based on the common object motion information, the third timestamp and the third pixels;

determining, by the server, if the actual position of the third common object pixels and the estimated position of the third common object pixels matches; and in response to the actual position of the third common object pixels and the estimated position of the third common object pixels not matching, generating, by the server, the synthetic image based on the third image and at least one of the first image and the second image and comprising at least the third common object pixels and the correction pixels, the generating comprises:

assigning, by the server, the third common object pixels to the estimated position of the third common object pixels within the synthetic image;

determining, by the server, correction pixel positions of the correction pixels and the correction pixels based on the actual position of the third common object pixels and at least one of the first image and the second image;

assigning, by the server, the correction pixels to the correction pixel positions of the correction pixels within the synthetic image;

and wherein in response to the motion state of the different object being dynamic, the method further comprises:

computing, by the server, the estimated position of the third different object pixels within the third pixels based on the different object motion information, the third timestamp and the third pixels;

determining, by the server, if the actual position of the third different object pixels and the estimated position of the third different object pixels matches; and in response to the actual position of the third different object pixels and the estimated position of the third different object pixels not matching, generating, by the server, the synthetic image based on the third image and at least one of the first image and the second image and comprising at least the third different object pixels and different correction pixels, the generating comprises:

assigning, by the server, the third different object pixels to the estimated position of the third different object pixels within the synthetic image;

determining, by the server, different correction pixel positions of the different correction pixels and the different correction pixels based on the actual position of the third different object pixels and at least one of the first image and the second image;

assigning, by the server, the different correction pixels to the different correction pixel positions of the different correction pixels within the synthetic image.

8. The method of claim 5, the method further comprising:

determining, by the server, a new image capturing frequency based on the common object motion information;

sending, by the server, an indication of the new image capturing frequency to the camera; and capturing, by the camera, new images according to the new image capturing frequency.

9. The method of claim 8, wherein the determining the new image capturing frequency comprises:

increasing image capturing frequency in response to the instant velocity of the common object at the time corresponding to the second timestamp being superior to an instant velocity threshold; and decreasing the image capturing frequency in response to the instant velocity of the common object at the time corresponding to the second timestamp being inferior to the instant velocity threshold.

10. The method of claim 1, wherein the generating the synthetic image comprises executing, by the server, a synthetic image generation procedure, the synthetic image generation procedure comprises generating, by the server, a first, a second and a third rendered state of the synthetic image.

11. The method of claim 10, wherein the executing the synthetic image generation procedure comprises executing, by the server, a correction verification routine.

12. The method of claim 1, wherein the determining the actual position of first common object pixels, the actual position of second common object pixels and the actual position of third common object pixels comprises performing, by the server, an object recognition technique.

13. A system for generating a synthetic image, the system comprising a camera, a client device and a server, the system being configured to:

receive, by the server from the camera, first data associated with a first image and second data associated with a second image, the first data comprising first pixels and a first timestamp, the second data comprising second pixels and a second timestamp, the first image and the second image depicting a common object;

determine, by the server, an actual position of first common object pixels within the first pixels and an actual position of second common object pixels within the second pixels, the first common object pixels and the second common object pixels being associated with the common object in the first image and the second image, respectively;

compute, by the server, a common object motion information based on the actual position of the first common object pixels, the actual position of the second common object pixels, the first timestamp and the second timestamp, the common object motion information being representative of a movement pattern of the common object between a position of the common object in the first image and a position of the common object in the second image;

receive, by the server from the camera, third data associated with a third image, the third data comprising third pixels and a third timestamp, the third image depicting the common object;

receiving, by the server, third data associated with a third image, the third data comprising third pixels and a third timestamp, the third image depicting the common object, the third image having been captured after the second image, and the second image having been captured after the first image in a sequential manner, with a time delay between the end of capturing of one image and beginning of capturing of a following image in the sequence is at least zero seconds;

determine, by the server, an actual position of third common object pixels within the third pixels, the third common object pixels being associated with the common object in the third image;

compute, by the server, an estimated position of the third common object pixels within the third pixels based on the common object motion information, the third timestamp and the third pixels;

determine, by the server, if the actual position of the third common object pixels and the estimated position of the third common object pixels match; and in response to the actual position of the third common object pixels and the estimated position of the third common object pixels not matching, generate, by the server, the synthetic image based on the third image and at least one of the first image and the second image and comprising at least the third common object pixels and correction pixels, to generate the system is configured to:

assign, by the server, the third common object pixels to the estimated position of the third common object pixels within the synthetic image;

determining, by the server, correction pixel positions of the correction pixels by parsing the synthetic image to determine pixel positions that have been left blank after the assigning the third common object pixels;

determining, by the server, the correction pixels by identifying pixels within at least one of the first image and the second image to be assigned to the pixel positions that have been left blank in the synthetic image; and assign, by the server, the correction pixels to the correction pixel positions of the correction pixels within the synthetic image;

send, by the server to the client device, at least one of the first image, the second image and the synthetic image for displaying the at least one of the first image, the second image and the synthetic image to a user of the client device.

14. A server for generating a synthetic image, the server comprising a processor for executing computer readable instructions, the processor being configured to:

receive first data associated with a first image and second data associated with a second image, the first data comprising first pixels and a first timestamp, the second data comprising second pixels and a second timestamp, the first image and the second image depicting a common object;

determine an actual position of first common object pixels within the first pixels and an actual position of second common object pixels within the second pixels, the first common object pixels and the second common object pixels being associated with the common object in the first image and the second image, respectively;

compute a common object motion information based on the actual position of the first common object pixels, the actual position of the second common object pixels, the first timestamp and the second timestamp, the common object motion information being representative of a movement pattern of the common object between a position of the common object in the first image and a position of the common object in the second image;

receive third data associated with a third image, the third data comprising third pixels and a third timestamp, the third image depicting the common object;

receiving, by the server, third data associated with a third image, the third data comprising third pixels and a third timestamp, the third image depicting the common object, the third image having been captured after the second image, and the second image having been captured after the first image in a sequential manner, with a time delay between the end of capturing of one image and beginning of capturing of a following image in the sequence is at least zero seconds;

determine an actual position of third common object pixels within the third pixels, the third common object pixels being associated with the common object in the third image;

compute an estimated position of the third common object pixels within the third pixels based on the common object motion information, the third timestamp and the third pixels;

determine if the actual position of the third common object pixels and the estimated position of the third common object pixels match; and in response to the actual position of the third common object pixels and the estimated position of the third common object pixels not matching, generate the synthetic image based on the third image and at least one of the first image and the second image and comprising at least the third common object pixels and correction pixels, to generate the synthetic image comprises the processor being configured to:

assign the third common object pixels to the estimated position of the third common object pixels within the synthetic image;

determining, by the server, correction pixel positions of the correction pixels by parsing the synthetic image to determine pixel positions that have been left blank after the assigning the third common object pixels;

determining, by the server, the correction pixels by identifying pixels within at least one of the first image and the second image to be assigned to the pixel positions that have been left blank in the synthetic image; and assign the correction pixels to the correction pixel positions of the correction pixels within the synthetic image.

\* \* \* \* \*